United States Patent
Zafar

(10) Patent No.: US 8,238,528 B2
(45) Date of Patent: Aug. 7, 2012

(54) AUTOMATIC ANALYSIS OF VOICE MAIL CONTENT

(75) Inventor: Shadman Zafar, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1216 days.

(21) Appl. No.: 11/771,330

(22) Filed: Jun. 29, 2007

(65) Prior Publication Data

US 2009/0003540 A1 Jan. 1, 2009

(51) Int. Cl.
*H04M 1/64* (2006.01)
*G10L 15/26* (2006.01)

(52) U.S. Cl. ................. 379/88.23; 704/235

(58) Field of Classification Search ............... 379/67.1, 379/93.24, 88.19, 88.12, 88.22, 88.23, 142.04, 379/142.16, 265.02; 704/2–3, 235; 709/204, 709/206–207, 227; 455/412.1, 412.2, 413, 455/414.2, 461, 466

See application file for complete search history.

(56) References Cited

U.S. PATENT DOCUMENTS

| | | | |
|---|---|---|---|
| 7,545,784 B2 * | 6/2009 | Mgrdechian et al. | 370/338 |
| 7,593,740 B2 * | 9/2009 | Crowley et al. | 455/456.3 |
| 7,640,233 B2 * | 12/2009 | Baartman et al. | 1/1 |
| 7,689,655 B2 * | 3/2010 | Hewitt et al. | 709/206 |
| 7,725,098 B1 * | 5/2010 | Claudatos et al. | 455/411 |
| 2003/0177008 A1 * | 9/2003 | Chang | 704/255 |
| 2004/0102957 A1 * | 5/2004 | Levin | 704/3 |
| 2005/0201362 A1 * | 9/2005 | Klein et al. | 370/352 |
| 2006/0025113 A1 * | 2/2006 | Nguyen et al. | 455/412.1 |
| 2006/0233319 A1 * | 10/2006 | Van Zandt et al. | 379/67.1 |
| 2007/0123280 A1 * | 5/2007 | McGary et al. | 455/466 |
| 2008/0037529 A1 * | 2/2008 | Bangalore et al. | 370/354 |
| 2008/0040354 A1 * | 2/2008 | Ray et al. | 707/10 |
| 2008/0205610 A1 * | 8/2008 | Bishop | 379/93.24 |
| 2008/0240383 A1 * | 10/2008 | Fronczak et al. | 379/88.19 |
| 2009/0083032 A1 * | 3/2009 | Jablokov et al. | 704/235 |
| 2010/0014649 A1 * | 1/2010 | Codignotto | 379/93.24 |
| 2010/0144329 A1 * | 6/2010 | Lasensky et al. | 455/417 |
| 2010/0197329 A1 * | 8/2010 | Claudatos et al. | 455/466 |

* cited by examiner

*Primary Examiner* — Davetta W Goins
*Assistant Examiner* — Mohammad Islam

(57) ABSTRACT

A device receives an audio voice mail message, converts the audio voice mail message to a text voice mail message, analyzes the text voice mail message for voice mail information, and provides the voice mail information associated with the audio voice mail message to enable review of the voice mail information.

25 Claims, 19 Drawing Sheets

FIG. 6

| NO. | DATE/TIME | PHONE NO. | NAME | DURATION | URGENCY | REVIEWED |
|---|---|---|---|---|---|---|
| 1 | May 7, 2007 11:10AM | (888) 888-8888 | John Doe | 0:30 minutes | Medium | Yes |
| 2 | May 6, 2007 10:00AM | (999) 999-9999 | Jane Doe | 1:45 minutes | High | No |
| 3 | April 29, 2007 3:00PM | (222) 222-2222 | John Smith | 0:45 minutes | Low | Yes |

AUTOMATIC ANALYSIS OF VOICE MAIL CONTENT

BACKGROUND

Voice mail is ubiquitous in the telecommunications world. Calling a voice mail system is the most common method for reviewing voice mail messages. However, the method is linear, requiring a user to listen to each message in turn, with the ability to skip messages being the user's only option for navigating a list of voice mail messages.

A voice mail message includes recorded speech. The subject and/or content of a voice mail message cannot be ascertained without actually listening to the message. The only information currently provided to the user by a voice mail message is a name of a person who created the message, and a date and time of the message. Some products enable users to access voice messages mail with a computer. Such products may present the voice mail messages in a list form, along with the dates and times of the messages, and the names or phone numbers of the persons who created the messages (if available).

BRIEF DESCRIPTION OF THE DRAWINGS

FIG. 6 is a diagram of an exemplary user interface that may be provided by the VMA server of FIG. 1, depicts information associated with voice mail messages;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and methods that automatically analyze voice mail messages and provide information (e.g., topics, keywords, context, etc.) about voice mail messages that may be valuable to a user in prioritizing review of the voice mail messages. The systems and methods may filter the content of the voice mail messages and may perform actions on the voice mail messages based on user preferences. For example, in one implementation, the systems and methods may convert the audio voice mail messages to text voice mail messages, and may extract information (e.g., topics, summary, keywords, context, etc.) from the text voice mail messages. The information, the text voice mail messages, and the voice mail messages may be provided (e.g., displayed) to a user, and the user may access, review, prioritize, reply to, etc. this content as desired.

Figure 1:
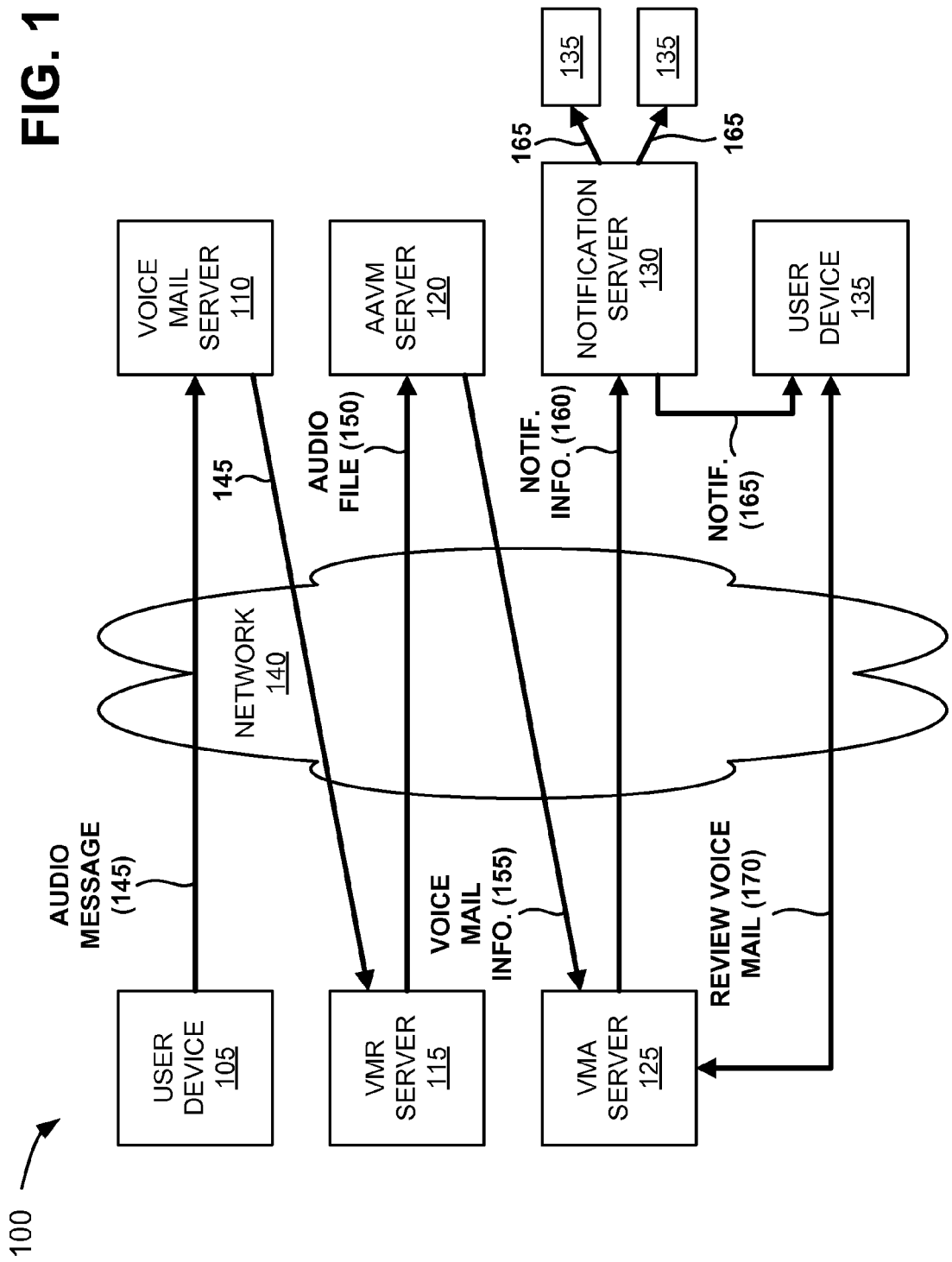
FIG. 1 is an exemplary diagram of a network in which systems and methods described herein may be implemented.

FIG. 1 is an exemplary diagram of a network 100 in which systems and methods described herein may be implemented. Network 100 may include a user device 105, a voice mail server 110, a voice mail retrieval (VMR) server 115, an automatic analysis of voice mail (AAVM) server 120, a voice mail access (VMA) server 125, a notification server 130, and a user device 135 connected via a network 140. Four user devices and five servers have been illustrated in FIG. 1 as connected to network 140 for simplicity. In practice, there may be more or less user devices and/or servers. Also, in some instances, a user device may perform one or more functions of a server, and a server may perform one or more functions of a user device. Furthermore, in other instances, one of servers 110-130 may perform one or more functions of another one of servers 110-130.

User device 105 and/or user devices 135 (hereinafter referred to as "user device 105/135" or "user devices 105/135") may include one or more entities. An entity may be defined as a device, such as a telephone, a mobile or cellular phone (e.g., providing Internet-based applications), a personal computer, a personal digital assistant (PDA), a laptop, a set top box (and/or an associated television and remote control), or another type of computation or communication device, a thread or process running on one of these devices, and/or an object executable by one of these devices. In one implementation, user device 105/135 may enable a user to create, review, access, prioritize, etc. voice mail messages in a manner described herein.

Voice mail server 110 may include one or more server entities that gather, process, search, and/or provide information in a manner described herein. For example, in one implementation, voice mail server 110 may be configured to receive (e.g., from user device 105) and store one or more voice mail messages in a manner described herein. In one example, voice mail server 110 may store voice mail messages as audio files. In another example, voice mail server 110 may create audio files from the voice mail messages and/or may associate the audio files with the voice mail messages.

VMR server 115 may include one or more server entities that gather, process, search, and/or provide information in a manner described herein. For example, in one implementation, VMR server 115 may retrieve voice mail messages from voice mail server 110. In one example, VMR server 115 may download copies of the audio files of the voice mail messages. VMR server 115 may provide the audio files to AAVM server 120 for processing in a manner described herein.

AAVM server 120 may include one or more server entities that gather, process, search, and/or provide information in a manner described herein. For example, in one implementation, AAVM server 120 may include speech processing logic that converts the audio voice mail messages into text, and analysis logic (e.g., databases, algorithms, etc.) that examines the resulting text and extracts information (e.g., topic, subject, keywords, context, etc.) from the text. AAVM server 120 may provide voice mail information (e.g., the extracted information, the audio voice mail messages, and/or the text voice mail messages) to VMA server 125. Further details of AAVM server 120 are provided below in connection with FIG. 3.

VMA server 125 may include one or more server entities that gather, process, search, and/or provide information in a manner described herein. For example, in one implementation, VMA server 125 may receive the voice mail information from AAVM server 120, and may determine a delivery method for the voice mail information based on user preferences. In one example, a user may prefer his/her voice mail information to be delivered to his/her cellular phone, computer, set top box (and television), PDA, etc. (e.g., user devices 135), and VMA server 125 may deliver the voice mail information to one of these user devices based on the user preferences. The user may review the voice mail information, with a selected user device, by accessing the voice mail information contained in VMA server 125. In other implementations, VMA server 125 may provide notification information related to the voice mail information to notification server 130. Further details of VMA server 125 are provided below in connection with FIG. 4.

Notification server 130 may include one or more server entities that gather, process, search, and/or provide information in a manner described herein. For example, in one implementation, notification server 130 may receive the notification information from VMA server 125, and may provide notification to one or more user devices 135. In one example, notification server 130 may provide notification via electronic mail (e-mail), short message service (SMS), text, or instant messages, and/or a pop-up message to a computer, a cellular phone, a PDA, a set top box, etc. (e.g., user devices 135).

Network 140 may include a Public Land Mobile Network (PLMN), a local area network (LAN), a wide area network (WAN), a metropolitan area network (MAN), a telephone network, such as the Public Switched Telephone Network (PSTN) or a cellular telephone network, an intranet, the Internet, or a combination of networks. User devices 105/135 and/or servers 110-130 may connect to network 140 via wired and/or wireless connections.

In an exemplary operation, as shown in FIG. 1, user device 105 may create an audio message 145 (e.g., an voice mail message) that may be provided to and stored within voice mail server 110. Voice mail server 110 may provide audio message 145 (or a copy of audio message 145) to VMR server 115, and VMR server 115 may provide a copy of the audio message (e.g., an audio file 150) to AAVM server 120. AAVM server 120 may convert audio file 150 into a text file, may extract voice mail information 155 (e.g., topic, subject, keywords, context, date, time, phone number, party, etc.) from the text file, and may provide voice mail information 155, audio file 150, and/or the text file to VMA server 125. VMA server 160 may provide notification information 160, related to voice mail information 155, to notification server 130, and may enable user device 135 to review voice mail information 155 (as indicated by reference number 170). Notification server 130 may receive notification information 160, and may provide notification 165 (e.g., via e-mail, SMS, text, or instant messages, a pop-up message, etc.) to one or more user devices 135. Notification 165 may prompt a user (e.g., via user device 135) to review voice mail information 155 (as indicated by reference number 170).

Although FIG. 1 shows exemplary components of network 100, in other implementations, network 100 may contain fewer, different, or additional components than depicted in FIG. 1.

Figure 2:
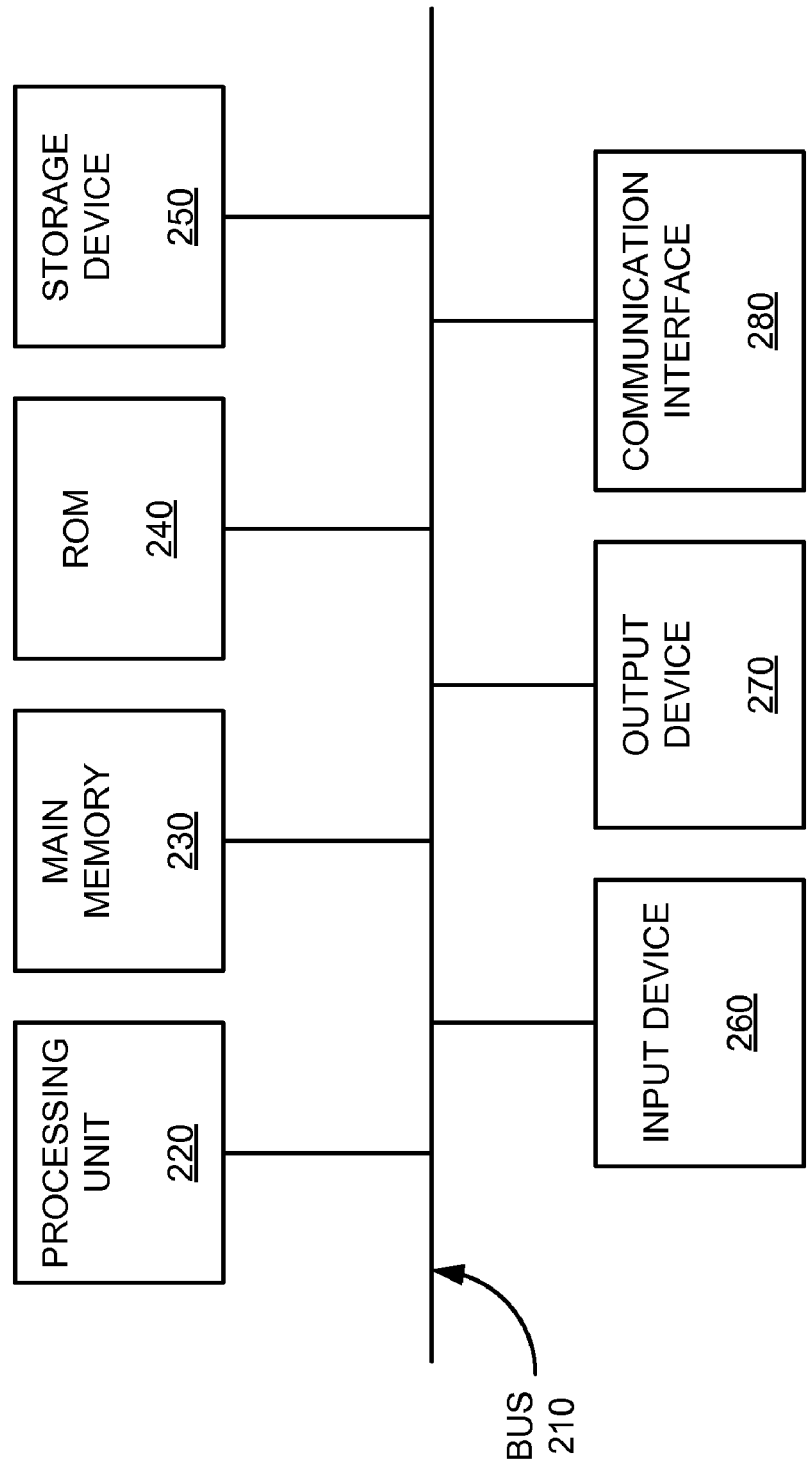
FIG. 2 is an exemplary diagram of a user device and/or a server of FIG. 1.

FIG. 2 is an exemplary diagram of a user device/server entity corresponding to user devices 105/135 and/or servers 110-130. As illustrated, the user device/server entity may include a bus 210, a processing unit 220, a main memory 230, a read-only memory (ROM) 240, a storage device 250, an input device 260, an output device 270, and/or a communication interface 280. Bus 210 may include a path that permits communication among the components of the user device/server entity.

Processing unit 220 may include a processor, microprocessor, or other type of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to the user device/server entity, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables the user device/server entity to communicate with other devices and/or systems. For example, communication interface 280 may include mechanisms for communicating with another device or system via a network, such as network 140.

As will be described in detail below, the user device/server entity may perform certain operations in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the user device/server entity, in other implementations, the user device/server entity may contain fewer, different, or additional components than depicted in FIG. 2. In still other implementations, one or more components of the user device/server entity may perform the tasks performed by one or more other components of the user device/server entity.

Figure 3:
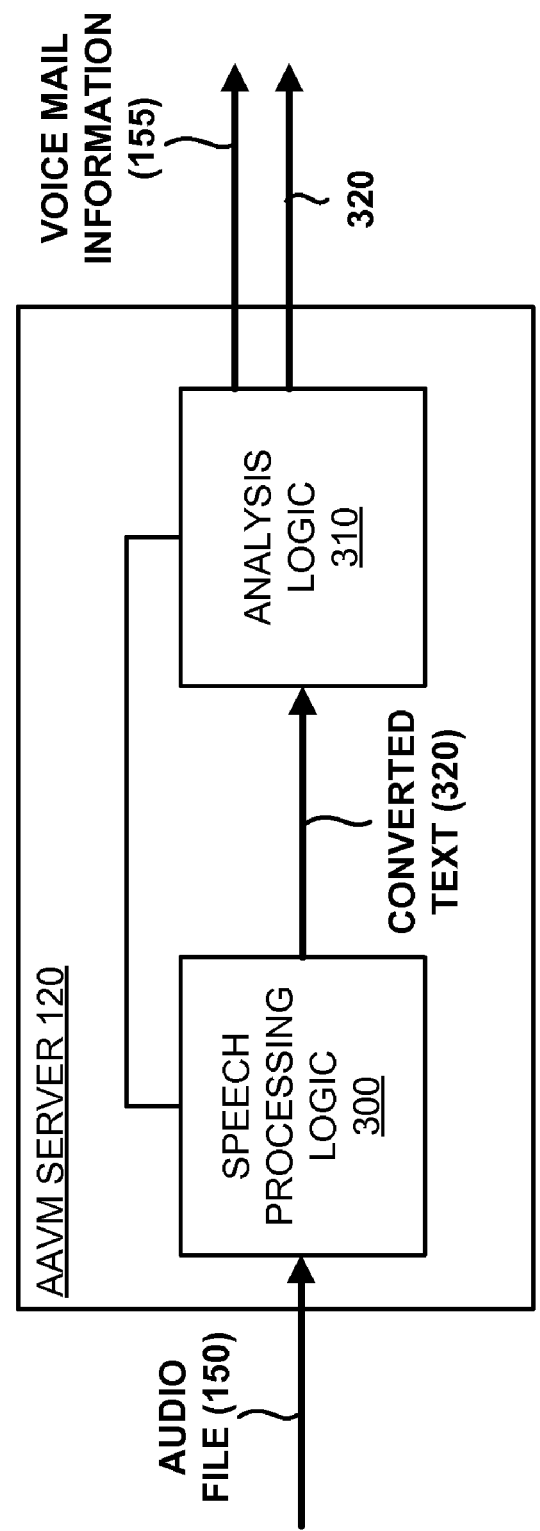
FIG. 3 is a diagram depicting exemplary functions capable of being performed by an automatic analysis of voice mail (AAVM) server of FIG. 1.

FIG. 3 is a diagram depicting exemplary functions capable of being performed by AAVM server 120. As illustrated, AAVM server 120 may include a variety of functional components, such as speech processing logic 300 and/or analysis logic 310. In one implementation, speech processing logic 300 and/or analysis logic 310 may correspond to functions performed by a software application contained in a memory (e.g., main memory 230, ROM 240, and/or storage device 250) of AAVM server 120.

Speech processing logic 300 may receive audio file 150 (e.g., from VMR server 115), and may convert audio file 150 into converted text 320. In one implementation, speech processing logic 300 may include hardware logic, software logic, and/or a combination of hardware and software logic that provides conventional speech recognition by converting a speech signal (e.g., audio file 150) to a sequence of words. For example, speech processing logic 300 may include any logic capable of converting audio voice mail messages to text files, any logic capable of converting a speech signal (e.g., audio file 150) to a sequence of words via an algorithm, etc. In one exemplary implementation, processing logic 300 may include any statistical speech recognition technique, such as acoustic modeling speech recognition and/or language modeling speech recognition. Acoustic modeling speech recognition may include hidden Markov model (HMM)-based speech recognition (e.g., a statistical model that may output a sequence of symbols or quantities), neural network-based speech recognition, and/or dynamic time warping (DTW)-based speech recognition. Language modeling speech recognition may assign a probability to a sequence of words by means of a probability distribution, may attempt to capture properties of a language, and may attempt to predict a next word in a speech sequence.

Speech processing logic 300 may convert audio file 150 to converted text 320 in non-real time and within a predetermined degree of accuracy. Since speech processing logic 300 may not convert audio file 150 to converted text 320 in real time, the accuracy of converted text 320 may be much higher than in real-time speech recognition systems. Speech processing logic 300 may provide converted text 320 to analysis logic 310.

Analysis logic 310 may receive converted text 320, may analyze converted text 320, and may extract voice mail information 155 (e.g., topic, subject, keywords, context, etc.) from converted text 320. In one implementation, analysis logic 310 may include hardware logic, software logic, and/or a combination of hardware and software logic that provides conventional mechanisms for extracting information (e.g., keywords, topics, subjects, context, etc.) from a text file. For example, analysis logic 310 may include databases and/or algorithms that examine converted text 320 for information (e.g., keywords, topics, subjects, context, etc.), and extract such information in the form of voice mail information 155. Analysis logic 310 may provide audio file 150, voice mail information 155, and/or converted text 320 to VMA server 125.

Although FIG. 3 shows exemplary functional components of AAVM server 120, in other implementations, AAVM server 120 may contain fewer, different, or additional functional components than depicted in FIG. 3. In still other implementations, one or more functional components of AAVM server 120 may perform the tasks performed by one or more other functional components of AAVM server 120.

Figure 4:
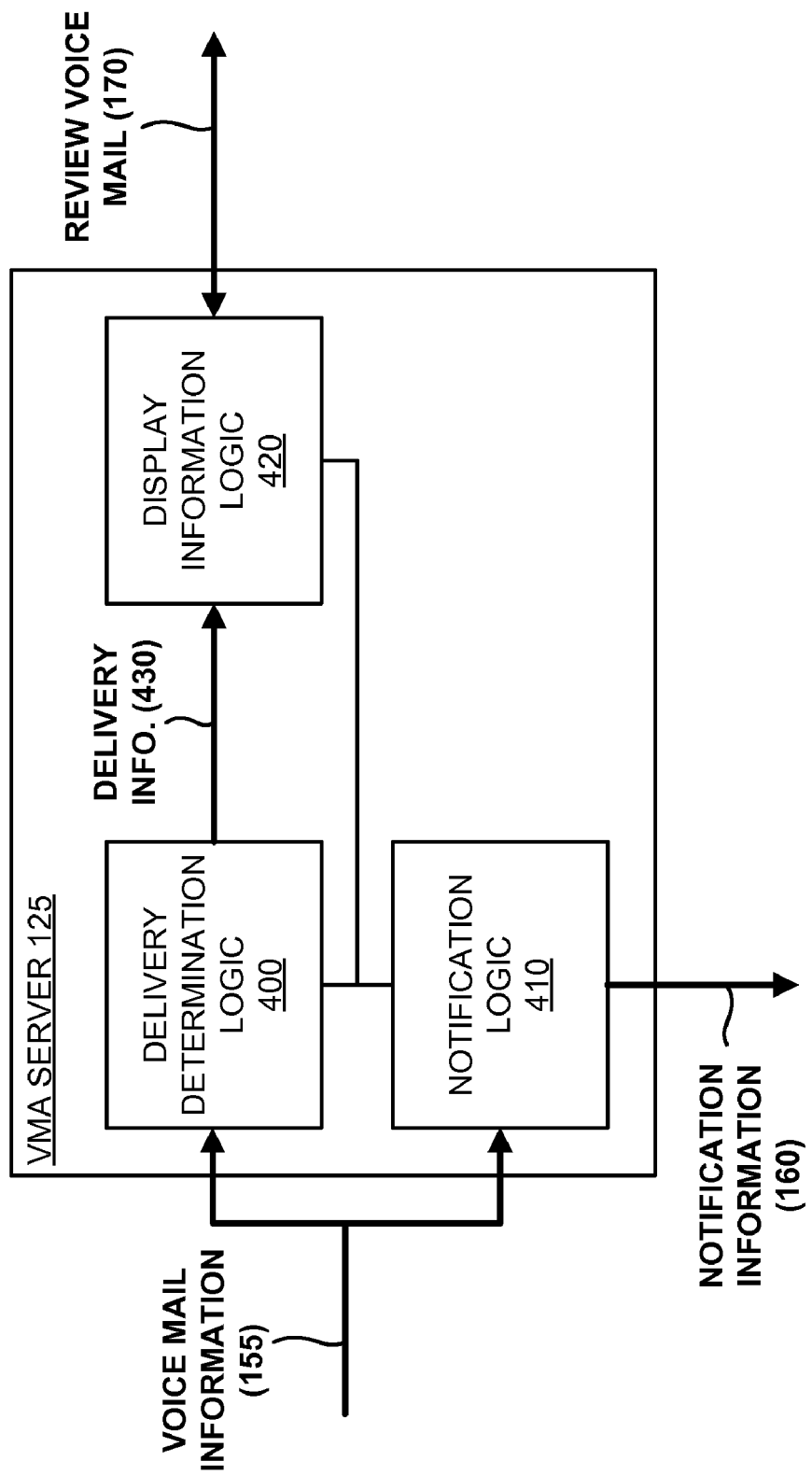
FIG. 4 is a diagram depicting exemplary functions capable of being performed by a voice mail access (VMA) server of FIG. 1.

FIG. 4 is a diagram depicting exemplary functions capable of being performed by VMA server 125. As illustrated, VMA server 125 may include a variety of functional components, such as a delivery determination logic 400, notification logic 410, and/or display information logic 420. In one implementation, determination logic 400, notification logic 410, and/or display information logic 420 may correspond to functions performed by a software application contained in a memory (e.g., main memory 230, ROM 240, and/or storage device 250) of server 120.

Delivery determination logic 400 may receive voice mail information 155 (e.g., from AAVM server 120), and may determine a delivery method for voice mail information 155 based on user preferences. In one implementation, delivery determination logic 400 may include hardware logic, software logic, and/or a combination of hardware and software logic that determines a delivery method for voice mail information 155. For example, a user may prefer his/her voice mail information 155 to be delivered to his/her cellular phone, computer, set top box (and television), PDA, etc. (e.g., user devices 135), and delivery determination logic 400 may determine delivery of voice mail information 155 to one of these user devices based on the user preferences. Delivery determination logic 400 may provide delivery information 430 to display information logic 420. Delivery information 430 may include audio file 150, voice mail information 155, converted text 320, and/or a method of delivering such information (e.g., via a cellular phone, a computer, etc.).

Notification logic 410 may receive voice mail information 155 (e.g., from AAVM server 120), and may determine notification information 160 to be provided to notification server 130. In one implementation, notification logic 410 may include hardware logic, software logic, and/or a combination of hardware and software logic that determines notification information 160. Notification information 160 may include, for example, voice mail information 155 and/or a method of notifying a user of receipt of a voice mail (e.g., via e-mail, a SMS message, and/or a pop-up message to a computer, a cellular phone, a PDA, a set top box, etc.).

Display information logic 420 may receive delivery information 430 and may provide one or more user interfaces. The user interfaces may display voice mail information 155 and/or converted text 320, and may enable a user to access, review, prioritize, reply to, etc. voice mail messages. In one implementation, display information logic 420 may include hardware logic, software logic, and/or a combination of hardware and software logic that provides one or more user interfaces, as described below in connection with FIGS. 6-11. For example, display information logic 420 may display information, such as a date and time of a voice mail message, a phone number or name of a party that created the voice mail message, a duration of the voice mail message, an urgency of the voice mail message, and/or an indication of whether a user reviewed the voice mail message. In another example, display information logic 420 may display voice mail messages that include topical and/or context information extracted by AAVM server 120 (e.g., by analysis logic 320). A user (e.g., via user devices 135) may navigate the voice mail messages provided by display information logic 420, and may select, review, delete, forward, reply to, etc. one or more voice mail messages (as indicated by reference number 170).

In one implementation, VMA server 125 may include logic to associate voice mail information 155 with an address book. For example, each user may be associated with an address book that associates telephone numbers with one or more persons. If voice mail information 155 does not include an identification of the person leaving the voice mail, VMA server 125 may attempt to match a telephone number, associated with a voice mail, with a telephone number (e.g., and a person) provided in the address book. If voice mail information 155 includes an identification of the person leaving the voice mail, VMA server 125 may compare the identified person with a person provided in the address book (if available). If the identified person does not match the person provided in the address book, VMA server 125 may use the more reliable information (e.g., the identified person if the address book is not up to date, or the address book if it is up to date). In one exemplary implementation, the address book may be a network address book that may be stored in a database provided in VMA server 125 or capable of being accessed by VMA server 125.

Although FIG. 4 shows exemplary functional components of VMA server 125, in other implementations, VMA server 125 may contain fewer, different, or additional functional components than depicted in FIG. 4. In still other implementations, one or more functional components of VMA server 125 may perform one or more of the tasks performed by one or more other functional components of VMA server 125. For example, VMA server 125 may include and/or may access one or more personal communications services (e.g., iobi home, Iobi Professional), and/or any architecture associated with such personal communications services. In this example, the architecture associated with such personal communications service may perform a variety of tasks, including one or more of the tasks performed by one or more of the functional components of VMA server 125.

Figure 5:
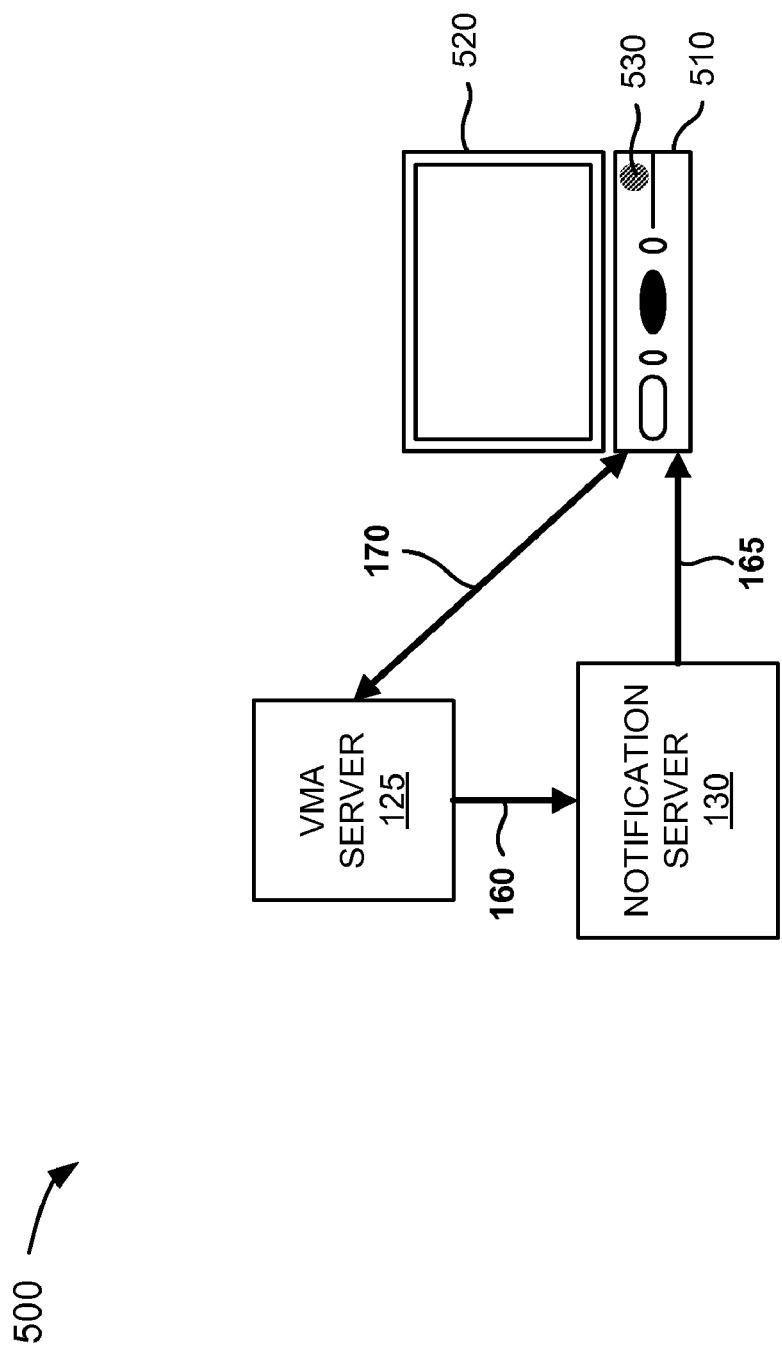
FIG. 5 is an exemplary diagram of an alternative portion of the network depicted in FIG. 1.

FIG. 5 is an exemplary diagram of an alternative portion 500 of network 100. As illustrated, alternative portion 500 of network 100 may include a set top box 510 associated with a television, screen, or monitor 520 (hereinafter referred to as "television 520"). Set top box 510 and television 520 may correspond to an exemplary implementation of user devices 135 shown in FIG. 1. In one implementation, set top box 510 may include hardware logic, software logic, and/or a combination of hardware and software logic that provides a listing of voice mail message (e.g., incoming or previously received) on television 520, and enables a user to review, reply to, and/or perform other actions on the voice mail messages (e.g., forward as an e-mail attachment). Set top box 510 may include a message waiting indicator light 530 (or some other type of notification mechanism, e.g., a pop-up message provided on television 520) that may flash periodically to indicate receipt of new voice mail messages. Alternatively, set top box 510 may utilize other lights provided with set top box 510 as a message waiting indicator light.

As further shown in FIG. 5, set top box 510 may receive notification 165 from notification server 130 in a manner as described above in connection with FIG. 1. For example, notification server 130 may provide notification 165 (e.g., via e-mail, SMS, text, or instant messages, a pop-up message, etc.) to set top box 510 (which may illuminate message waiting indicator light 530), and television 520 may display notification 165. Notification 165 may prompt a user (e.g., via set top box 510 and/or television 520) to review new voice mail messages.

Set top box 510 may interact with VMA server 125 (as indicated by reference number 170) to enable a user to access, review, prioritize, reply to, etc. voice mail messages (e.g., via television 520 and/or a remote control (not shown)). In one implementation, television 520, via set top box 510, may provide any of the exemplary information capable of being provided by display information logic 420 of VMA server 125, as described above in connection with FIG. 4. In other implementations, television 520, via set top box 510, may provide any of the exemplary information described below in connection with FIGS. 6-11.

Although FIG. 5 shows exemplary components of alternative portion 500 of network 100, in other implementations, alternative portion 500 of network 100 may contain fewer, different, or additional components than depicted in FIG. 5. In still other implementations, one or more components of alternative portion 500 of network 100 may perform the tasks performed by one or more other components of alternative portion 500 of network 100.

FIG. 6 is a diagram of an exemplary user interface 600 that may be provided by VMA server 125 (e.g., by display information logic 420) to one of user devices 135 (e.g., to displays of user devices 135). As illustrated, user interface 600 may depict a variety of categories associated with voice mail messages, such as a voice mail message number category 605, a date/time category 610, a phone number category 615, a name category 620, a duration category 625, an urgency category 630, and/or a reviewed category 635. Each category may include multiple voice mail message-associated entries. For example, as shown in FIG. 6, user interface 600 may display a first entry 640, a second entry 645, and a third entry 650. Although user interface 600 depicts three entries, in other implementations, user interface 600 may display fewer, more, or different entries than depicted in FIG. 6. Furthermore, user interface 600 may display fewer, different, or additional categories than depicted in FIG. 6.

Voice mail message number category 605 may include numbers corresponding to the voice mail messages. For example, first entry 640 may include the number "1" under voice mail message number category 605, second entry 645 may include the number "2" under voice mail message number category 605, and third entry 650 may include the number "3" under voice mail message number category 605.

Date/time category 610 may include a date and/or a time when a voice mail message was received. For example, first entry 640 may include the date and time "May 7, 2007 11:10 AM" under date/time category 610, second entry 645 may include the date and time "May 6, 2007 10:00 AM" under date/time category 610, and third entry 650 may include the date and time "Apr. 29, 2007 3:00 PM" under date/time category 610.

Phone number category 615 may include telephone numbers associated with the parties who created the voice mail messages. For example, first entry 640 may include the telephone number "(888) 888-8888" under phone number category 615, second entry 645 may include the telephone number "(999) 999-9999" under phone number category 615, and third entry 650 may include the telephone number "(222) 222-2222" under phone number category 615.

Name category 620 may include names associated with the parties who created the voice mail messages. For example, first entry 640 may include the name "John Doe" under name category 620, second entry 645 may include the name "Jane Doe" under name category 620, and third entry 650 may include the name "John Smith" under name category 620.

Duration category 625 may include durations of the voice mail messages. For example, first entry 640 may include the duration "0:30 minutes" under duration category 625, second entry 645 may include the duration "1:45 minutes" under duration category 625, and third entry 650 may include the duration "0:45 minutes" under duration category 625.

Urgency category 630 may include urgency indicators (e.g., low, medium, high, etc.) associated with the voice mail messages. For example, first entry 640 may include a "Medium" urgency under urgency category 630, second entry 645 may include a "High" urgency under urgency category 630, and third entry 650 may include a "Low" urgency under urgency category 630.

Reviewed category 635 may include indications of whether a user reviewed associated voice mail messages. For example, first entry 640 may include an indication that a message was reviewed (e.g., a "Yes") under reviewed category 635, second entry 645 may include an indication that a message was not reviewed (e.g., a "No") under reviewed category 635, and third entry 650 may include an indication that a message was reviewed (e.g., a "Yes") under reviewed category 635.

As further shown in FIG. 6, a user may navigate the information provided by user interface 600 with a pointing device 655 (or other similar mechanism), and may select a particular voice mail message (e.g., one of entries 640-650) by hovering over and/or selecting one of entries 640-650 with pointing device 655.

Although FIG. 6 shows exemplary elements of user interface 600, in other implementations, user interface 600 may contain fewer, different, or additional elements than depicted in FIG. 6.

Figure 7:
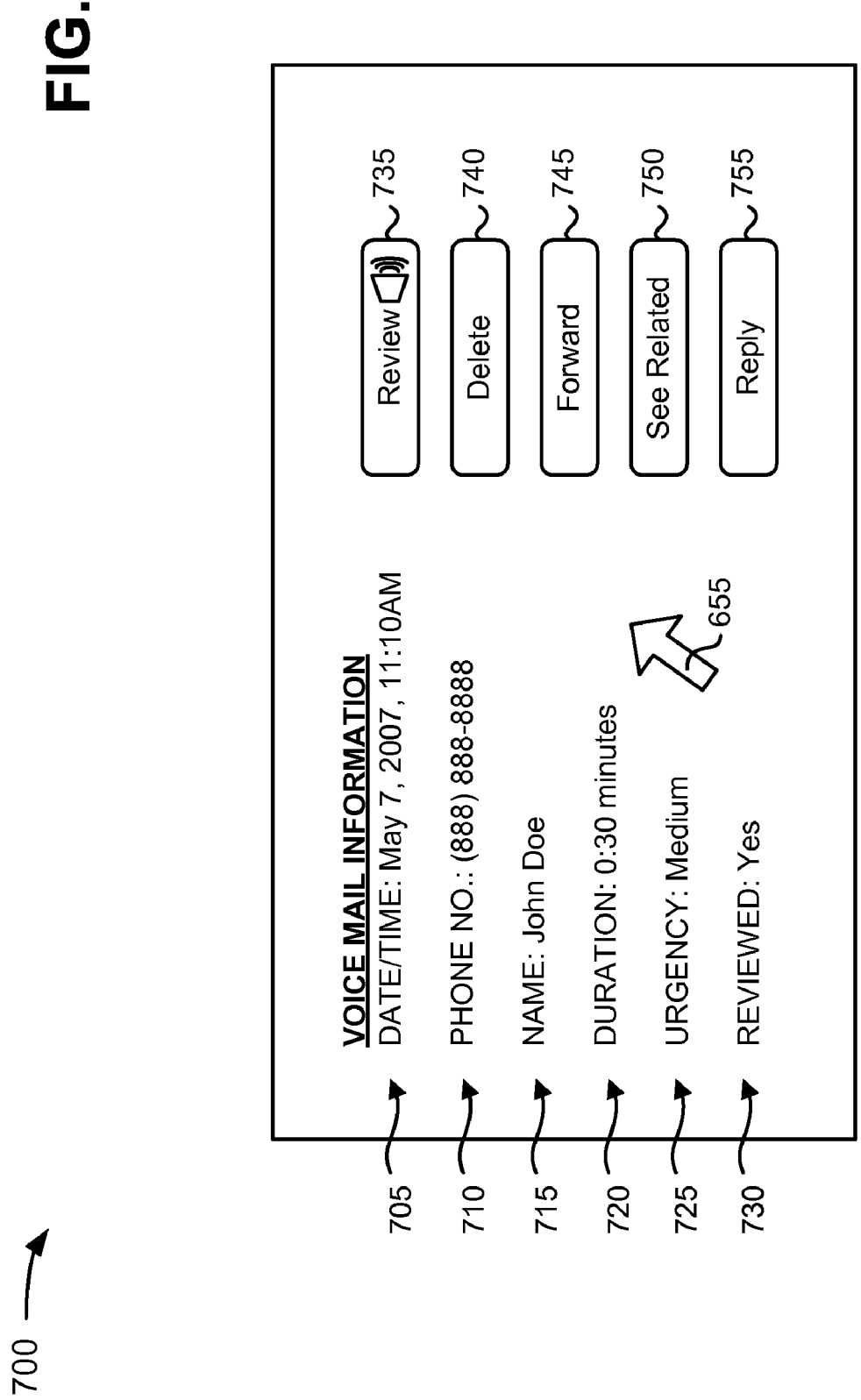
FIG. 7 is a diagram of an exemplary user interface that may be provided by the VMA server of FIG. 1, depicts voice mail information associated with a selected voice mail message.

FIG. 7 is a diagram of another exemplary user interface 700 that may be provided by VMA server 125 (e.g., by display information logic 420) to one of user devices 135 (e.g., to displays of user devices 135). User interface 700 may be displayed if a user selects one of the voice mail messages (e.g., one of entries 640-650 of FIG. 6). As shown in FIG. 7, user interface 700 may depict a variety of voice mail information associated with the selected voice mail message. For example, user interface 700 may include a date and/or time 705 (e.g., "May 7, 2007, 11:10 AM") of the selected voice mail message; a phone number 710 (e.g., "(888) 888-8888") and/or a name 715 (e.g., "John Doe") of the party who created the selected voice mail message; a duration 720 (e.g., "0:30 minutes") and/or an urgency indicator 725 (e.g., "Medium") of the selected voice mail message; and an indication 730 (e.g., "Yes") of whether the user reviewed the selected voice mail message.

As further shown in FIG. 7, user interface 700 may include a review button 735, a delete button 740, a forward button 745, a see related button 750, and/or a reply button 755. In other implementations, buttons 735-755 may be replaced with other similar mechanisms (e.g., icons, links, etc.). Buttons 735-755 may be selected by the user (e.g., with pointer 655) and may enable the user to perform a variety of functions. For example, if review button 735 is selected, the user may listen to the audio file associated with the selected voice mail message. If delete button 740 is selected, VMA server 125 may delete the selected voice mail message (e.g., from the list provided by user interface 600). If forward button 745 is selected, the user may forward the selected voice mail message to another one of user devices 135. If the see related button 750 is selected, the user may be presented with content related to the selected voice mail message, as described below in connection with FIG. 9. If the reply button 755 is selected, the user may be presented with options for replying to the selected voice mail message, as described below in connection with FIG. 10.

Although FIG. 7 shows exemplary elements of user interface 700, in other implementations, user interface 700 may contain fewer, different, or additional elements than depicted in FIG. 7.

Figure 8:
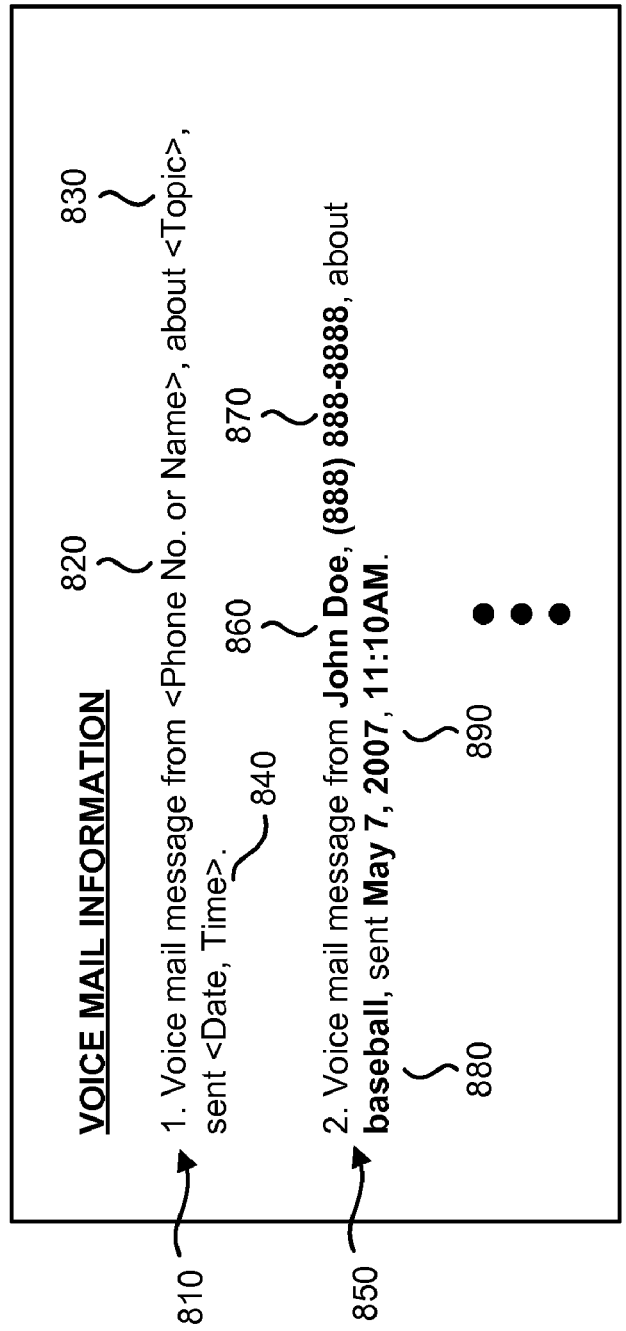
FIG. 8 is a diagram of an exemplary user interface that may be provided by the VMA server of FIG. 1, depicts alternative voice mail information associated with a selected voice mail message.

FIG. 8 is a diagram of an exemplary user interface 800 that may be provided by VMA server 125 (e.g., by display information logic 420) to one of user devices 135 (e.g., to displays of user devices 135). As shown in FIG. 8, user interface 800 may depict alternative information associated with voice mail messages. For example, in one implementation, instead of the category and entry arrangement of FIG. 6, user interface 800 may provide a voice mail message entry 810 that includes information (e.g., context, topical, etc. information) extracted from converted text 320 by analysis logic 310 of AAVM server 120, as described above in connection with FIG. 3. In one example, voice mail message entry 810 may include the text "Voice mail message from" followed by a phone number and/or name field 820 (e.g., which may have been provided by AAVM server 120). Voice mail message entry 810 may also include the text "about" followed by a topic field 830 (e.g., which may have been extracted by AAVM server 120). Voice mail message entry 810 may further include the text "sent" followed by a date and/or time field 840 (e.g., which may have been provided by AAVM server 120).

In another implementation, user interface 800 may provide another voice mail message entry 850 that includes information associated with fields 820-840. In one example, voice mail message entry 850 may include the text "Voice mail message from" followed by a name 860 (e.g., "John Doe") and a phone number 870 (e.g., "(888) 888-8888") of the party that created the voice mail message associated with voice mail message entry 850. Voice mail message entry 850 may also include the text "about" followed by a topic 880 (e.g., "baseball"), and the text "sent" followed by a date and/or time 890 (e.g., "May 7, 2007, 11:10 AM").

Although FIG. 8 shows exemplary elements of user interface 800, in other implementations, user interface 800 may contain fewer, different, or additional elements than depicted in FIG. 8.

Figure 9:
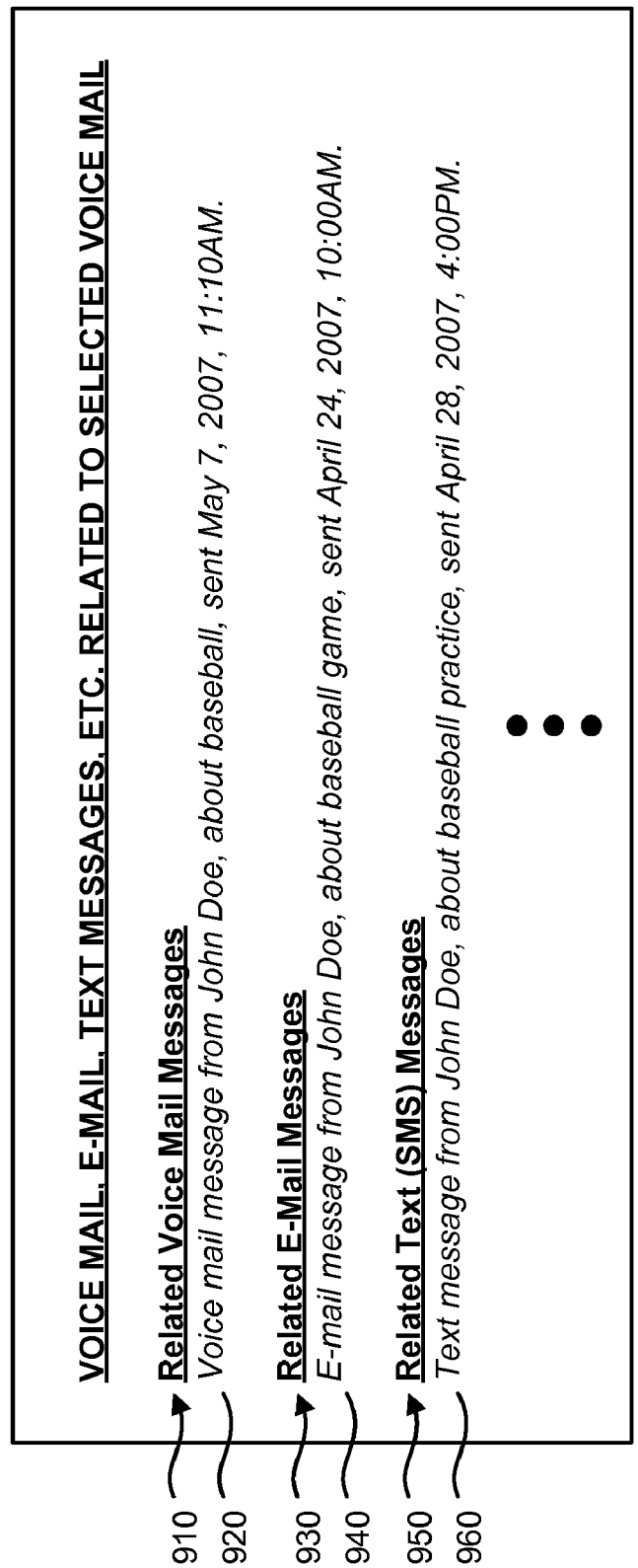
FIG. 9 is a diagram of an exemplary user interface that may be provided by the VMA server of FIG. 1, depicts content related to a selected voice mail message.

FIG. 9 is a diagram of an exemplary user interface 900 that may be provided by VMA server 125 (e.g., by display information logic 420) to one of user devices 135 (e.g., to displays of user devices 135). User interface 900 may be displayed if a user selects see related button 750 (FIG. 7). As shown in FIG. 9, user interface 900 may depict content (e.g., voice mail, e-mail, SMS, text, or instant messages, etc.) that may be related to the selected voice mail message of FIG. 7. The relation between the related content and the selected voice mail message may be based on user-defined preferences (e.g., similarity of subject matter, author, topic, date, etc.).

In one implementation, user interface 900 may include a section 910 that displays voice mail messages that may be related to the selected voice mail message. For example, section 910 may include a voice mail message 920 (e.g., that states "Voice mail message from John Doe, about baseball, sent May 7, 2007, 11:10 AM") that may be related to the selected voice mail message. Related voice mail message 920 may be related to the selected voice mail message based on author (e.g., "John Doe") and topical information (e.g., "baseball").

In another implementation, user interface 900 may include a section 930 that displays e-mail messages that may be related to the selected voice mail message. For example, section 930 may include an e-mail message 940 (e.g., that states "E-mail message from John Doe, about baseball game, sent Apr. 24, 2007, 10:00 AM") that may be related to the selected voice mail message. Related e-mail message 940 may be related to the selected voice mail message based on author (e.g., "John Doe") and topical information (e.g., "baseball").

In still another implementation, user interface 900 may include a section 950 that displays SMS, text, or instant messages that may be related to the selected voice mail message. For example, section 950 may include a SMS, text, or instant message 960 (e.g., that states "Text message from John Doe, about baseball practice, sent Apr. 28, 2007, 4:00 PM") that may be related to the selected voice mail message. Related SMS, text, or instant message 950 may be related to the selected voice mail message based on author (e.g., "John Doe") and topical information (e.g., "baseball").

Although FIG. 9 shows exemplary elements of user interface 900, in other implementations, user interface 900 may contain fewer, different, or additional elements than depicted in FIG. 9.

Figure 10:
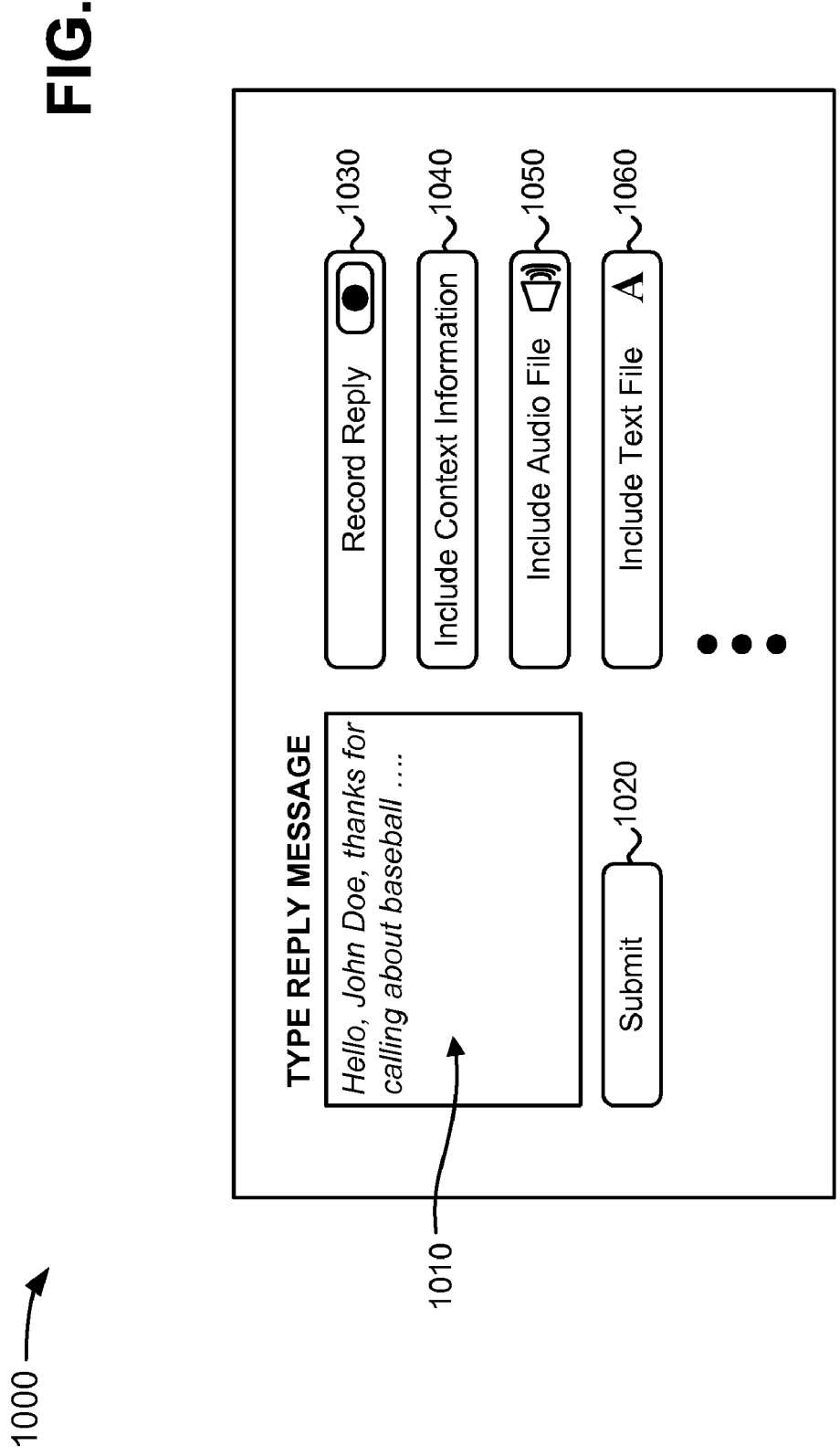
FIG. 10 is a diagram of an exemplary user interface that may be provided by the VMA server of FIG. 1, depicts alternatives for replying to a voice mail message.

FIG. 10 is a diagram of an exemplary user interface 1000 that may be provided by VMA server 125 (e.g., by display information logic 420) to one of user devices 135 (e.g., to displays of user devices 135). User interface 1000 may be displayed if a user selects reply button 755 (FIG. 7). As shown in FIG. 10, user interface 1000 may depict alternatives for replying to the selected voice mail message of FIG. 7. For example, user interface 1000 may include a section 1010 for typing a reply to the selected voice mail message, and a submit button 1020 (or other similar mechanism, e.g., an icon, a link, etc.) for submitting the reply typed in section 1010. If the user selects submit button 1020, the typed reply of section 1010 may be sent (e.g., via network 100) to the party who created the selected voice mail message (e.g., via an e-mail, SMS, text, or instant message). Alternatively and/or additionally, the typed reply of section 1010 may be converted into an audio reply (e.g., via a text-to-speech converter provided in AAVM server 120), and the audio reply may be sent (e.g., via network 100) to the party who created the selected voice mail message (e.g., via a voice mail message).

As further shown in FIG. 10, user interface 1000 may include a record reply button 1030, an include context information button 1040, an include audio file button 1050, and/or an include text file button 1060. In other implementations, buttons 1030-1060 may be replaced with other similar mechanisms (e.g., icons, links, etc.). Buttons 1030-1060 may be selected by the user (e.g., with pointer 655) and may enable the user to perform a variety of functions. For example, if record reply button 1030 is selected, the user may record an audio reply to the selected voice mail message (e.g., which may be provided via network 100 to the party who created the selected voice mail message). If include context information button 1040 is selected, VMA server 125 may include context information with the reply to the selected voice mail message, as described below in connection with FIG. 11. If include audio file button 1050 is selected, VMA server 125 may attach the audio file, associated with the selected voice mail message, with the reply to the selected voice mail message. If include text file button 1060 is selected, VMA server 125 may attach the converted text file (e.g., converted text 320), associated with the selected voice mail message, with the reply to the selected voice mail message. Attaching the audio file or the text file with the reply may enable the recipient of the selected voice mail message to seek clarification (e.g., if the selected voice mail message contained unintelligible speech).

Although FIG. 10 shows exemplary elements of user interface 1000, in other implementations, user interface 1000 may contain fewer, different, or additional elements than depicted in FIG. 10.

Figure 11:
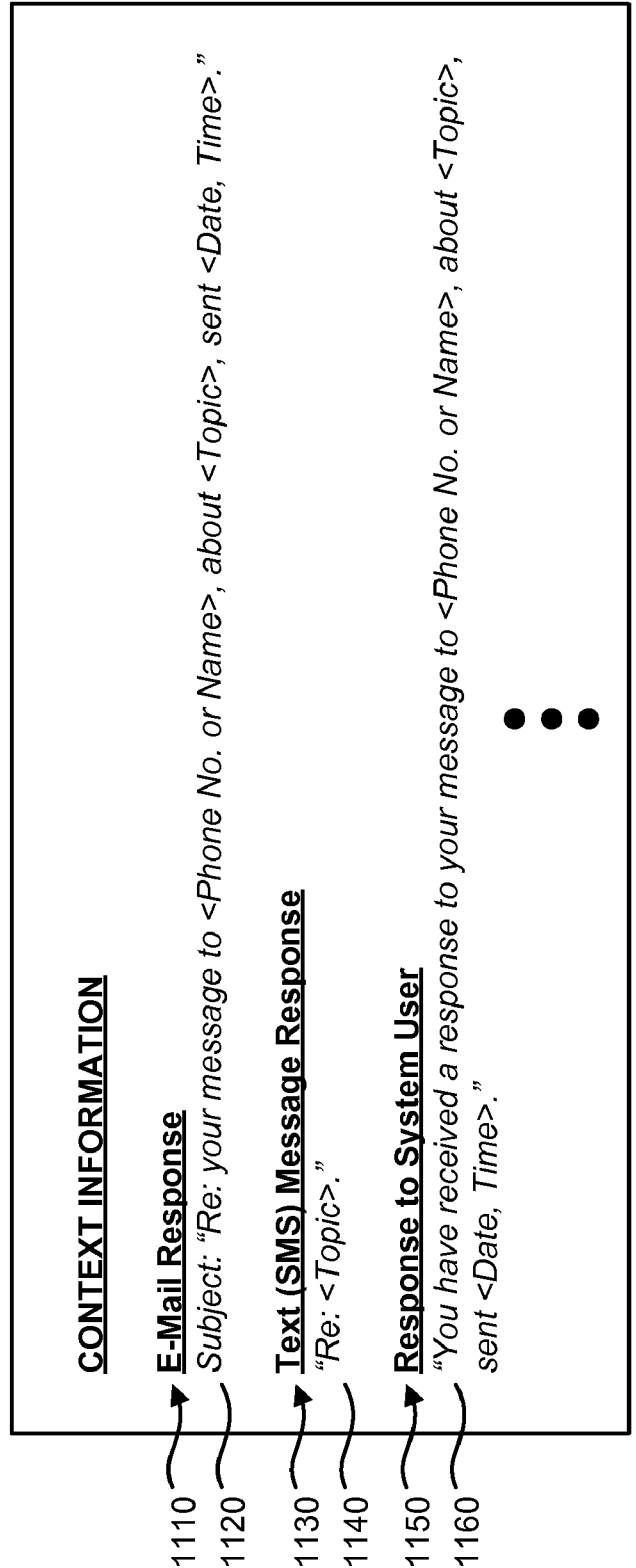
FIG. 11 is a diagram of an exemplary user interface that may be provided by the VMA server of FIG. 1, depicts context information to associate with replies to a voice mail message.

FIG. 11 is a diagram of an exemplary user interface 1100 that may be provided by VMA server 125 (e.g., by display information logic 420) to one of user devices 135 (e.g., to displays of user devices 135). User interface 1100 may be displayed if a user selects include context information button 1040 (FIG. 10). As shown in FIG. 11, user interface 1100 may depict context information to associate with replies to the selected voice mail message of FIG. 7. VMA server 125 may associate any of the context information of FIG. 11 with replies to the selected voice mail message.

In one implementation, user interface 1100 may include a section 1110 that displays, for e-mail responses, context information that may be related to the selected voice mail message. For example, section 1110 may include an e-mail response 1120 (e.g., that states "Re: your message to <Phone No. or Name>, about <Topic>, sent <Date, Time>.") that may include context information (e.g., phone number, name, topic, etc.) that may be related to the selected voice mail message.

In another implementation, user interface 1100 may include a section 1130 that displays, for SMS, text, or instant messages, context information that may be related to the selected voice mail message. For example, section 1130 may include a SMS, text, or instant message response 1140 (e.g., that states "Re: <Topic>.") that may include context information (e.g., topic) that may be related to the selected voice mail message.

In still another implementation, user interface 1100 may include a section 1150 that displays, for responses to a system user (e.g., a user in the same or similar voice mail plan as the recipient of the selected voice mail message), context information that may be related to the selected voice mail message. For example, section 1150 may include a response 1160 (e.g., that states "You have received a response to you message to <Phone No. or Name>, about <Topic>, sent <Date, Time>.") that may include context information (e.g., phone number, name, topic, etc.) that may be related to the selected voice mail message.

Although FIG. 11 shows exemplary elements of user interface 1100, in other implementations, user interface 1100 may contain fewer, different, or additional elements than depicted in FIG. 11.

Figure 12:
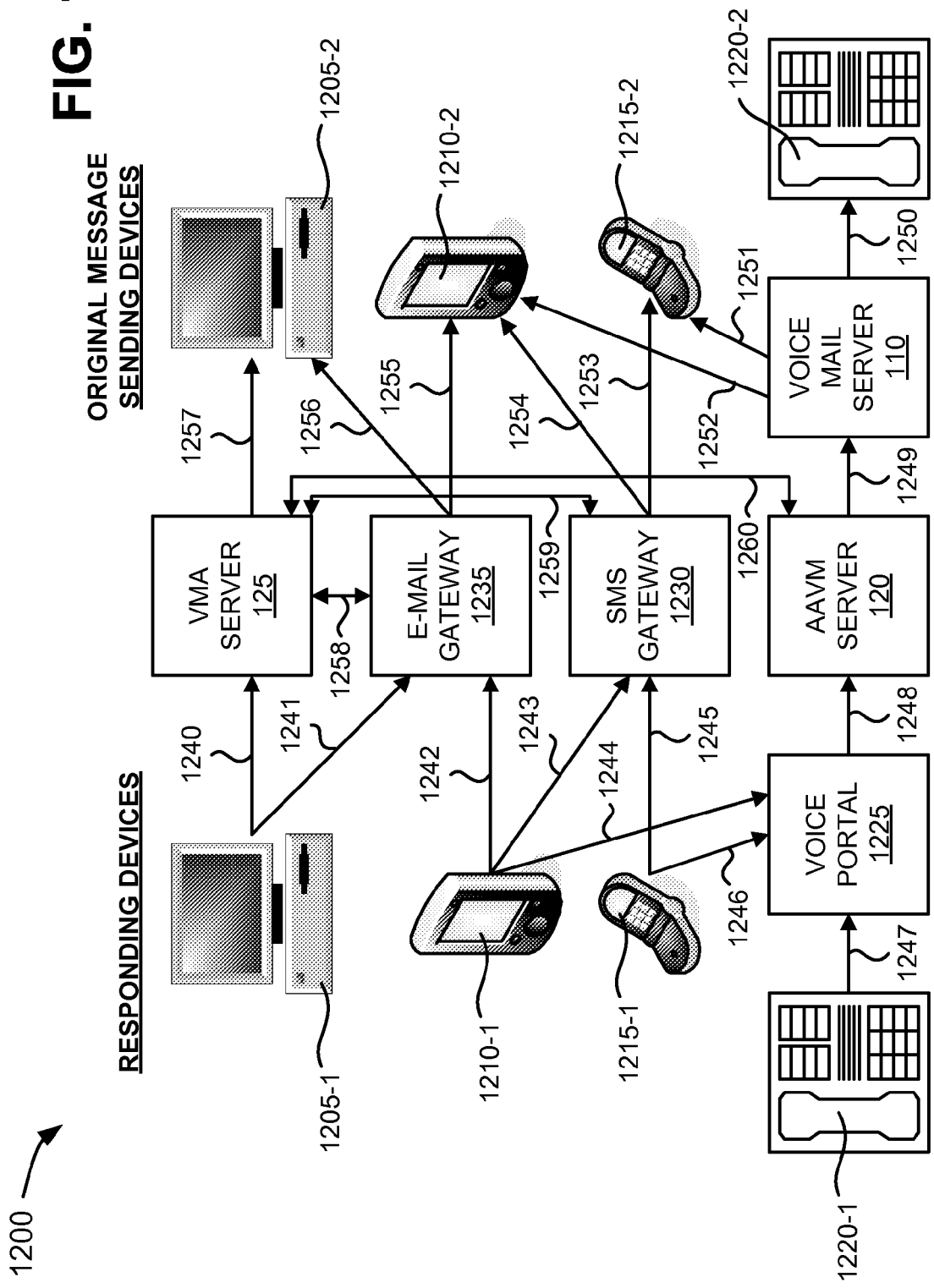
FIG. 12 is an exemplary diagram of another network in which systems and methods described herein may be implemented.

FIG. 12 is an exemplary diagram of another network 1200 in which systems and methods described herein may be implemented. As illustrated, network 1200 may include many of the components of network 100 (FIG. 1), such as voice mail server 110, AAVM server 120, and/or VMA server 125. Voice mail server 110, AAVM server 120, and/or VMA server 125 may perform any of the tasks described above in connection with FIGS. 1-11 for such devices. As further shown in FIG. 12, network 1200 may include computers 1205-1 and 1205-2, PDAs 1210-1 and 1210-2, mobile or cellular phones 1215-1 and 1215-2, and/or telephones 1220-1 and 1220-2. Computers 1205-1 and 1205-2, PDAs 1210-1 and 1210-2, mobile or cellular phones 1215-1 and 1215-2, and/or telephones 1220-1 and 1220-2 may correspond to exemplary implementations of user devices 105/135, and may perform any of the tasks that user devices 105 and/or 135 may perform, as described above in connection with FIGS. 1-11.

As further shown in FIG. 12, network may include a voice portal 1225, a SMS gateway 1230, and/or an e-mail gateway 1235. Although network 140 has been omitted from FIG. 12 for clarity, the components depicted in FIG. 12 may interconnect via wired and/or wireless connections of a network (e.g., network 140).

Voice portal 1225 may include one or more entities that gather, process, search, and/or provide information in a manner described herein. For example, in one implementation, voice portal 1225 may receive audio replies to voice mail messages from a responding device (e.g., telephone 1220-1), and may forward the audio replies to AAVM server 120.

SMS gateway 1230 may include one or more entities that gather, process, search, and/or provide information in a manner described herein. For example, in one implementation, SMS gateway 1225 may provide a gateway for SMS messages provided by responding devices (e.g., PDA 1210-1 and/or cellular phone 1215-1). SMS gateway 1230 may receive SMS messages from a responding device (e.g., PDA 1210-1 and/or cellular phone 1215-1), and may forward the SMS messages to devices that created an original voice mail message (hereinafter referred to as "sending devices"), such as PDA 1210-2 and/or cellular phone 1215-2.

E-mail gateway 1235 may include one or more entities that gather, process, search, and/or provide information in a manner described herein. For example, in one implementation, e-mail gateway 1235 may provide a gateway for e-mail messages provided by responding devices (e.g., computer 1205-1 and/or PDA 1210-1). E-mail gateway 1235 may receive e-mail messages from a responding device (e.g., computer 1205-1 and/or PDA 1210-1), and may forward the e-mail messages to sending devices (e.g., computer 1205-2 and/or PDA 1205-2).

As further shown in FIG. 12, responding devices (e.g., computer 1205-1, PDA 1210-1, cellular phone 1215-1, and/or telephone 1220-1) may reply to voice mail messages provided by sending devices (e.g., computer 1205-2, PDA 1210-2, cellular phone 1215-2, and/or telephone 1220-2) in a variety of ways. For example, responding computer 1205-1 may reply to a voice mail message by sending a reply 1240 via VMA server 125 and/or by sending an e-mail reply 1241 via e-mail gateway 1235. Responding PDA 1210-1 may reply to a voice mail message by sending an e-mail reply 1242 via e-mail gateway 1235, by sending a SMS reply 1243 via SMS gateway 1230, and/or by sending an audio reply 1244 via voice portal 1225. Responding cellular phone 1215-1 may reply to a voice mail message by sending a SMS reply 1245 via SMS gateway 1230 and/or by sending an audio reply 1246 via voice portal 1225. Responding telephone 1220-1 may reply to a voice mail message by sending an audio reply 1247 via voice portal 1225.

Voice portal 1225 may forward audio replies to AAVM server 120, as indicated by reference number 1248. AAVM server 120 may forward the audio replies to voice mail server 110, as indicated by reference number 1249. Voice mail server 110 may send the audio files to a sending device. For example, in one implementation, voice mail server 110 may send an audio reply 1250 to telephone 1220-2, may send an audio reply 1251 to cellular phone 1215-2, and/or may send an audio reply 1252 to PDA 1210-2.

SMS gateway 1230 may send SMS replies to a sending device. For example, in one implementation, SMS gateway 1230 may send a SMS reply 1253 to cellular phone 1215-2, and/or may send a SMS reply 1254 to PDA 1210-2.

E-mail gateway 1235 may send e-mail replies to a sending device. For example, in one implementation, e-mail gateway 1235 may send an email reply 1255 to PDA 1210-2, and/or may send an e-mail reply 1256 to computer 1205-2.

In one implementation, VMA server 125 may provide replies 1257 (e.g., audio, text, voice mail information, etc.) to computer 1205-2. VMA server 125 may communicate with e-mail gateway 1235 (as indicated by reference number 1258), SMS gateway 1230 (as indicated by reference number 1259), and/or AAVM server 120 (as indicated by reference number 1260) in order to perform any of the tasks described herein in connection with VMA server 125.

Although FIG. 12 shows exemplary components of network 1200, in other implementations, network 1200 may contain fewer, different, or additional components than depicted in FIG. 12. In still other implementations, one or more components of network 1200 may perform the tasks performed by one or more other components of network 1200.

Figure 13:
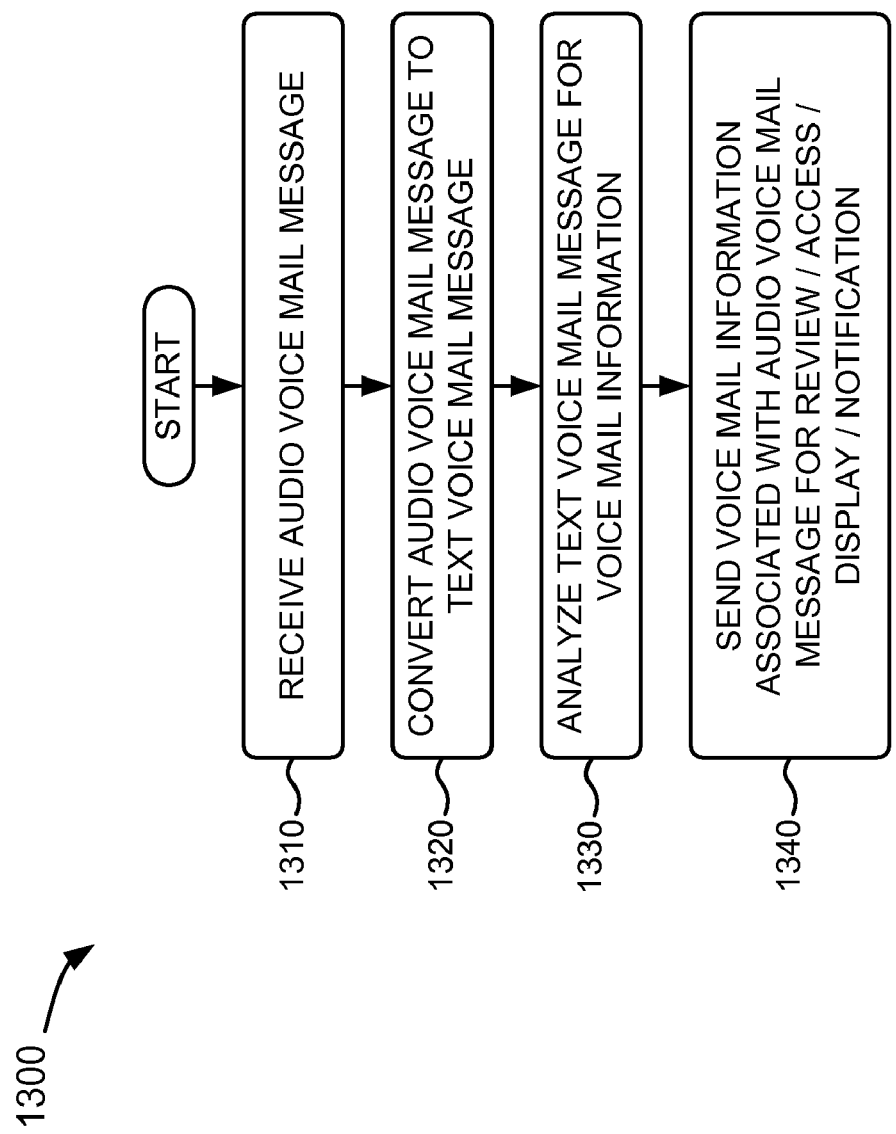
FIGS. 13-19 depict flow charts of exemplary processes according to implementations described herein.

FIGS. 13-19 depict flow charts of exemplary processes according to implementations described herein. FIG. 13 depicts an exemplary process 1300 that may be performed by AAVM server 120. As illustrated, process 1300 may begin with receipt of an audio voice mail message (block 1310). For example, in one implementation described above in connection with FIGS. 1 and 3, VMR server 115 may provide a copy of an audio voice mail message (e.g., audio file 150) to AAVM server 120. Speech processing logic 300 of AAVM server 120 may receive audio file 150 (e.g., from VMR server 115).

The audio voice mail message may be converted to a text voice mail message (block 1320). For example, in one implementation described above in connection with FIG. 3, speech processing logic 300 may convert audio file 150 into converted text 320. In one example, speech processing logic 300 may include hardware logic, software logic, and/or a combination of hardware and software logic that provides conventional speech recognition by converting a speech signal (e.g., audio file 150) to a sequence of words. Speech processing logic 300 may convert audio file 150 to converted text 320 in non-real time and within a predetermined degree of accuracy.

As further shown in FIG. 13, the text voice mail message may be analyzed for voice mail information (block 1330). For example, in one implementation described above in connection with FIG. 3, analysis logic 310 of AAVM server 120 may receive converted text 320, may analyze converted text 320, and may extract voice mail information 155 (e.g., topic, subject, keywords, context, etc.) from converted text 320.

The voice mail information associated with the audio voice mail message may be sent to another device to enable access and/or display of the voice mail information, and/or to provide notification of receipt of the audio voice mail message (block 1340). For example, in one implementation described above in connection with FIGS. 1 and 3, analysis logic 310 may provide audio file 150, voice mail information 155, and/or converted text 320 to VMA server 125. VMA server 125 may enable a user (e.g., via user devices 135) to access, display, prioritize, reply to, etc. audio voice mail message, and may enable notification server 130 to provide notification to the user of receipt of the audio voice mail message.

Figure 14:
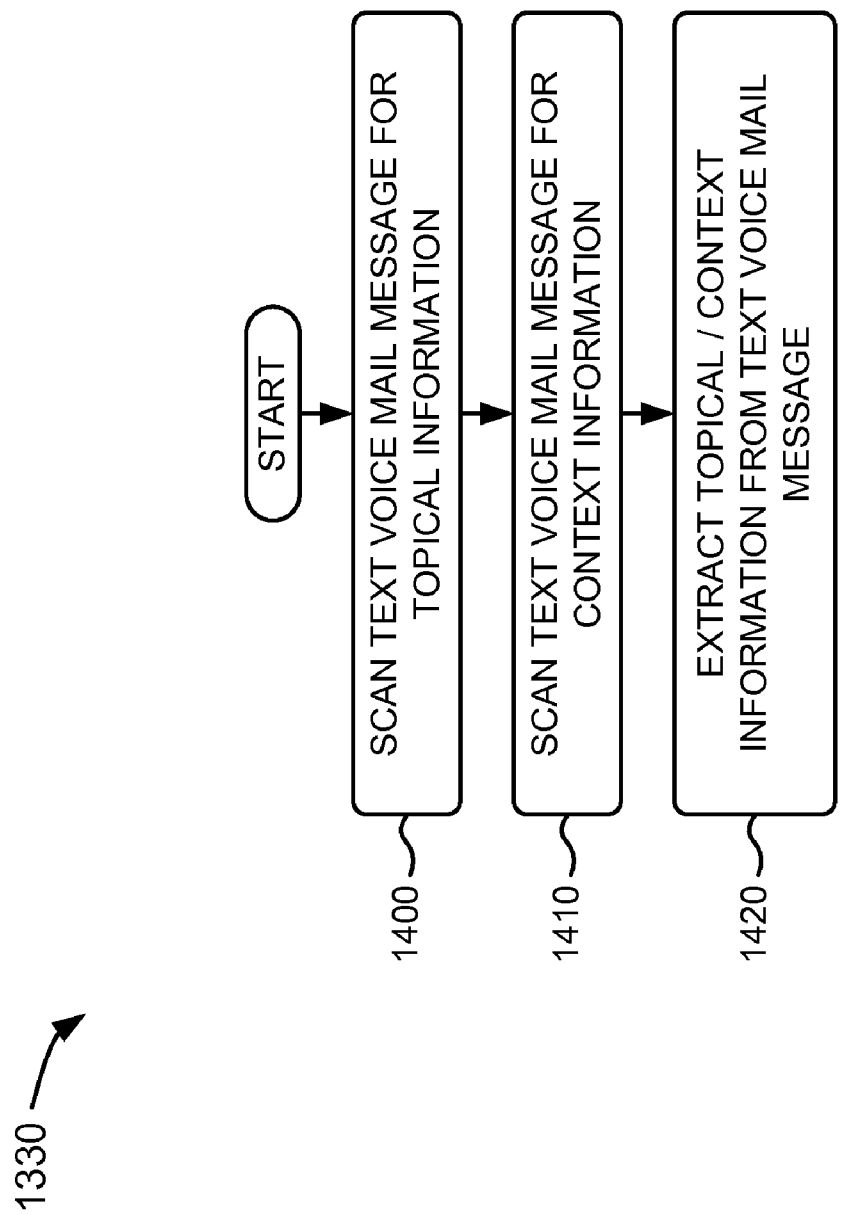

Process block 1330 may include the process blocks illustrated in FIG. 14. As shown in FIG. 14, process block 1330 may include scanning the text voice mail message for topical information (block 1400) and scanning the text voice mail message for context information (block 1410). For example, in one implementation described above in connection with FIG. 3, analysis logic 310 of AAVM server 120 may include databases and/or algorithms that examine or scan converted text 320 for information (e.g., keywords, topics, subjects, context, etc.).

As further shown in FIG. 14, process block may include extracting the topical and/or context information from the text voice mail message (block 1420). For example, in one implementation described above in connection with FIG. 3, analysis logic 310 of AAVM server 120 may include hardware logic, software logic, and/or a combination of hardware and software logic that provides conventional mechanisms for extracting information (e.g., keywords, topics, subjects, context, etc.) from a text file. In one example, analysis logic 310 may include databases and/or algorithms that extract such information in the form of voice mail information 155.

Figure 15:
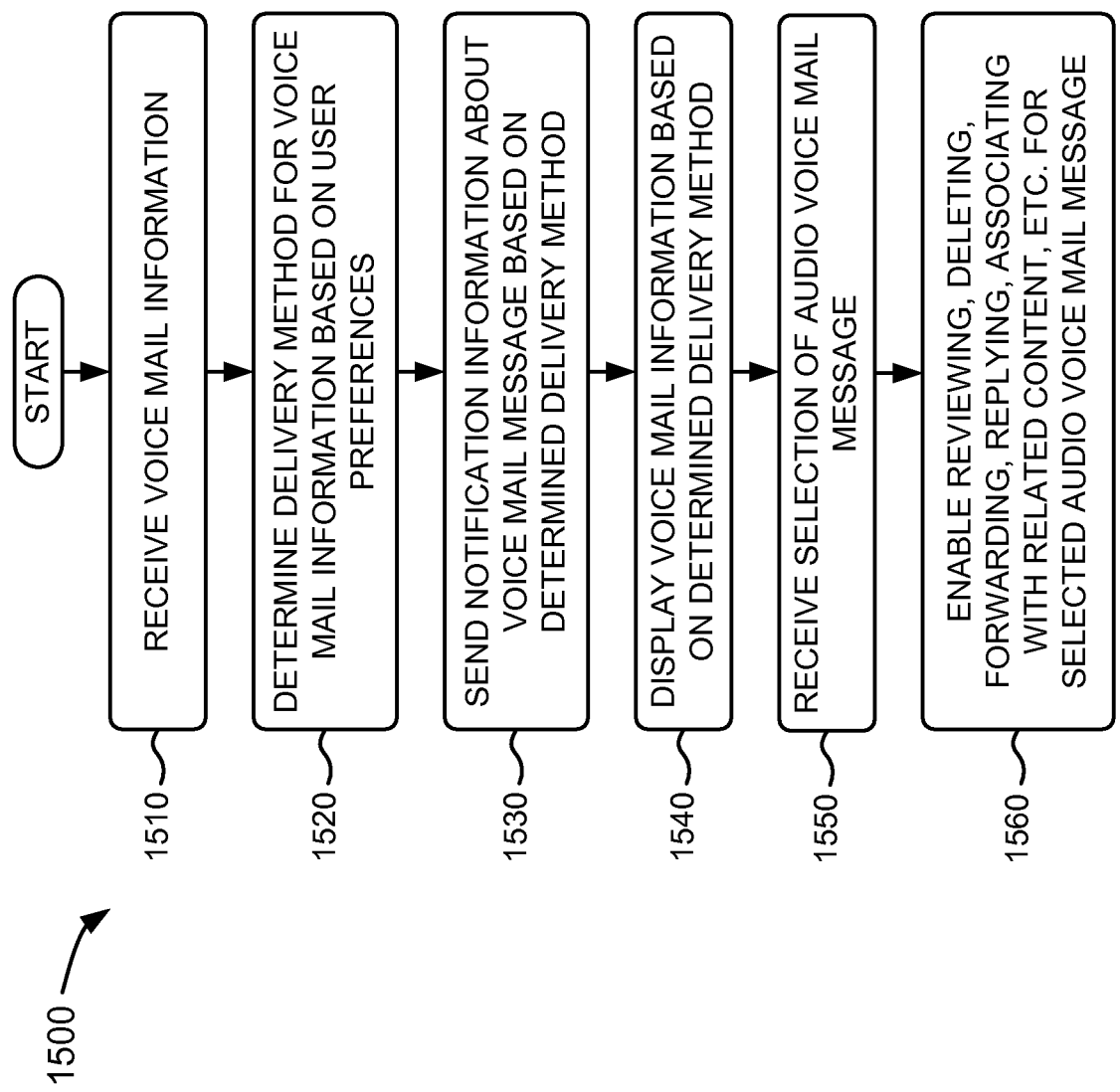

FIG. 15 depicts an exemplary process 1500 that may be performed by VMA server 125. As illustrated, process 1500 may begin with receipt of voice mail information (block 1510). For example, in one implementation described above in connection with FIG. 4, delivery determination logic 400 of VMA server 125 may receive voice mail information 155 (e.g., from AAVM server 120).

A deliver method for the voice mail information may be determined based on user preferences (block 1520). For example, in one implementation described above in connection with FIG. 4, delivery determination logic 400 may determine a delivery method for voice mail information 155 based on user preferences. In one example, a user may prefer his/her voice mail information 155 to be delivered to his/her cellular phone, computer, set top box (and television), PDA, etc. (e.g., user devices 135), and delivery determination logic 400 may determine delivery of voice mail information 155 to one of these user devices based on the user preferences.

As further shown in FIG. 15, notification information about the voice mail message may be sent based on the determined delivery method (block 1530). For example, in one implementation described above in connection with FIG. 4, notification logic 410 of VMA server 125 may receive voice mail information 155 (e.g., from AAVM server 120), and may determine notification information 160 to be provided to notification server 130. Notification information 160 may include, in one example, voice mail information 155 and/or a method of notifying a user of receipt of a voice mail (e.g., via e-mail, a SMS message, and/or a pop-up message to a computer, a cellular phone, a PDA, a set top box, etc.).

The voice mail information may be displayed based on the determined delivery method (block 1540). For example, in one implementation described above in connection with FIG. 4, display information logic 420 of VMA server 125 may receive delivery information 430 and may provide one or more user interfaces. The user interfaces may display voice mail information 155 and/or converted text 320, and may enable a user to access, review, prioritize, reply to, etc. voice mail messages. In one example, display information logic 420 may display information, such as a date and time of a voice mail message, a phone number or name of a party that created the voice mail message, a duration of the voice mail message, an urgency of the voice mail message, and/or an indication of whether a user reviewed the voice mail message. In another example, display information logic 420 may display voice mail messages that include topical and/or context information extracted by AAVM server 120 (e.g., by analysis logic 320).

As further shown in FIG. 15, a selection of an audio voice mail message may be received (block 1550), and reviewing, deleting, forwarding, replying to, associating with related content, etc. may be enabled for the selected audio voice mail message (block 1560). For example, in one implementation described above in connection with FIG. 4, a user (e.g., via user devices 135) may navigate the voice mail messages provided by display information logic 420, and may select, review, delete, forward, reply to, associate with related content, etc. one or more voice mail messages (as indicated by reference number 170). In other implementations described above in connection with FIGS. 6-11, VMA server 125 may provide user interfaces that display voice mail messages and/or associated voice mail information, and enable a user to review, select, delete, forward, reply to, etc. voice mail messages.

Figure 16:

Process block 1540 may include the process blocks illustrated in FIG. 16. As shown in FIG. 16, process block 1540 may include displaying a date and/or a time of the audio voice mail message (block 1600), and/or displaying a phone number and/or a name of a party who created the audio voice mail message (block 1610). For example, in one implementation described above in connection with FIG. 6, user interface 600 (e.g., provided by VMA server 125) may depict date/time category 610, phone number category 620, and/or name category 620. Date/time category 610 may include a date and/or a time when a voice mail message was received. Phone number category 615 may include telephone numbers associated with the parties who created the voice mail messages. Name category 620 may include names associated with the parties who created the voice mail messages.

Process block 1540 may also include displaying a duration of the audio voice mail message (block 1620), and/or displaying an urgency of the audio voice mail message (block 1630). For example, in one implementation described above in connection with FIG. 6, user interface 600 may depict duration category 625 and/or urgency category 630. Duration category 625 may include durations of the voice mail messages. Urgency category 630 may include urgency indicators (e.g., low, medium, high, etc.) associated with the voice mail messages.

As further shown in FIG. 16, process block 1540 may include displaying whether the audio voice mail message has been reviewed (block 1640). For example, in one implementation described above in connection with FIG. 6, user interface 600 may depict reviewed category 635. Reviewed category 635 may include indications of whether a user reviewed associated voice mail messages. In one example, first entry 640 may include an indication that a message was reviewed (e.g., a "Yes") under reviewed category 635, and second entry 645 may include an indication that a message was not reviewed (e.g., a "No") under reviewed category 635.

Figure 17:
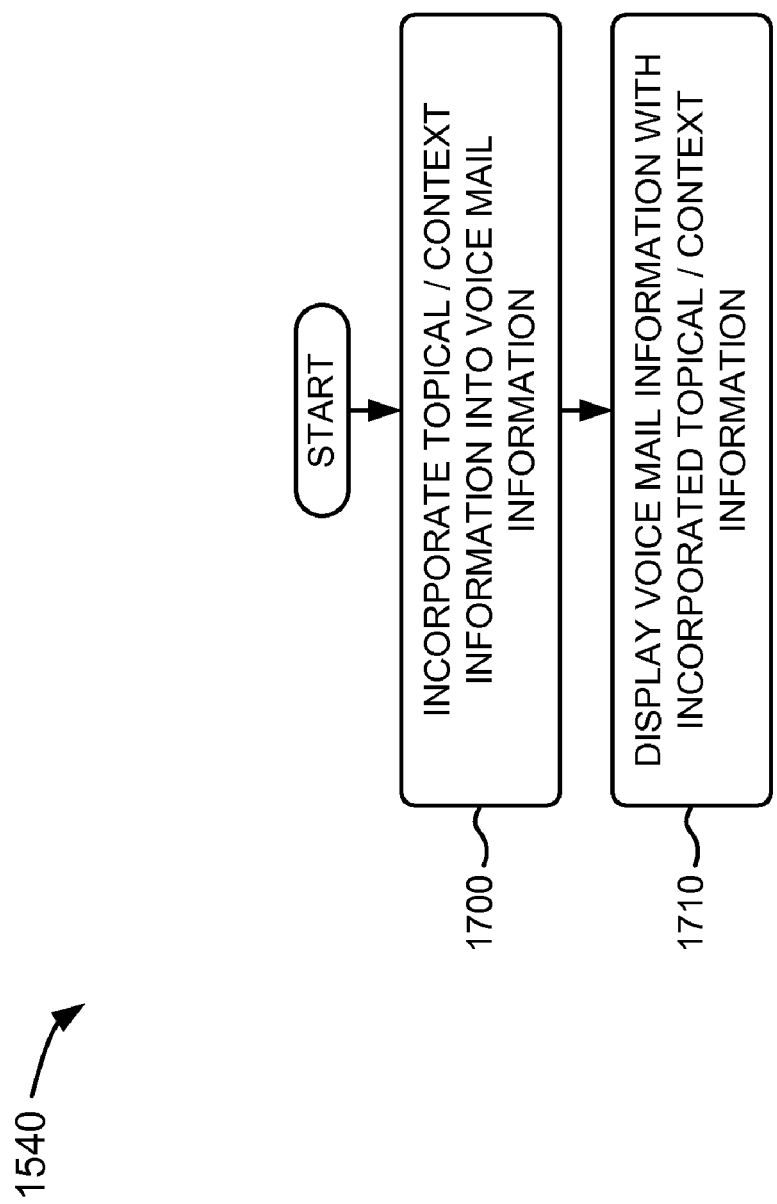

Alternatively and/or additionally, process block 1540 may include the process blocks illustrated in FIG. 17. As shown in FIG. 17, process block 1540 may include incorporating topical and/or context information into the voice mail information (block 1700), and/or displaying the voice mail information with the incorporated topical and/or context information (block 1710). For example, in one implementation described above in connection with FIG. 8, user interface 800 (e.g., provided by VMA server 125) may depict voice mail message entry 810 that includes information (e.g., context, topical, etc. information) extracted from converted text 320 by analysis logic 310 of AAVM server 120. Voice mail message entry 810 may include the text "Voice mail message from" followed by phone number and/or name field 820 (e.g., which may have been provided by AAVM server 120). Voice mail message entry 810 may also include the text "about" followed by topic field 830 (e.g., which may have been extracted by AAVM server 120). Voice mail message entry 810 may further include the text "sent" followed by date and/or time field 840 (e.g., which may have been provided by AAVM server 120).

Figure 18:
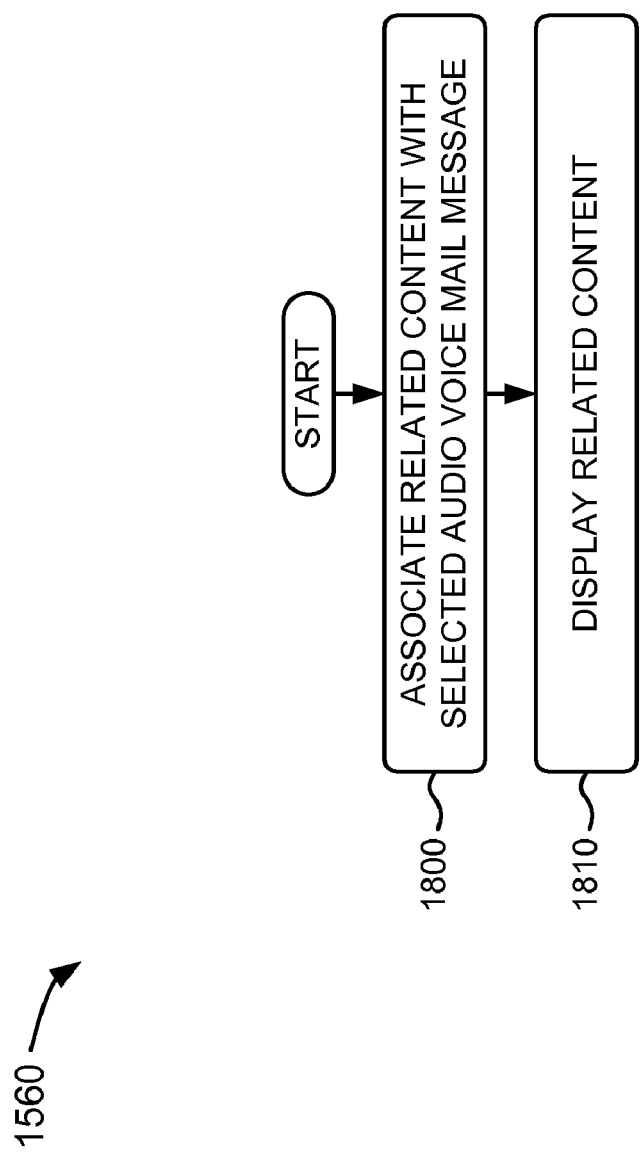

Process block 1560 may include the process blocks illustrated in FIG. 18. As shown in FIG. 18, process block 1560 may include associating related with the selected audio voice mail message (block 1800), and/or displaying the related content (block 1810). For example, in one implementation described above in connection with FIG. 9, user interface 900 (e.g., provided by VMA server 125) may depict content (e.g., voice mail, e-mail, SMS, text, or instant messages, etc.) that may be related to the selected voice mail message. The relation between the related content and the selected voice mail message may be based on user-defined preferences (e.g., similarity of subject matter, author, topic, date, etc.), and VMA server 125 may associate the related with the selected voice mail message. In one example, user interface 900 may include section 910 that displays voice mail messages that may be related to the selected voice mail message. In another example, user interface 900 may include section 930 that displays e-mail messages that may be related to the selected voice mail message. In still another example, user interface 900 may include section 950 that displays SMS, text, or instant messages that may be related to the selected voice mail message.

Figure 19:
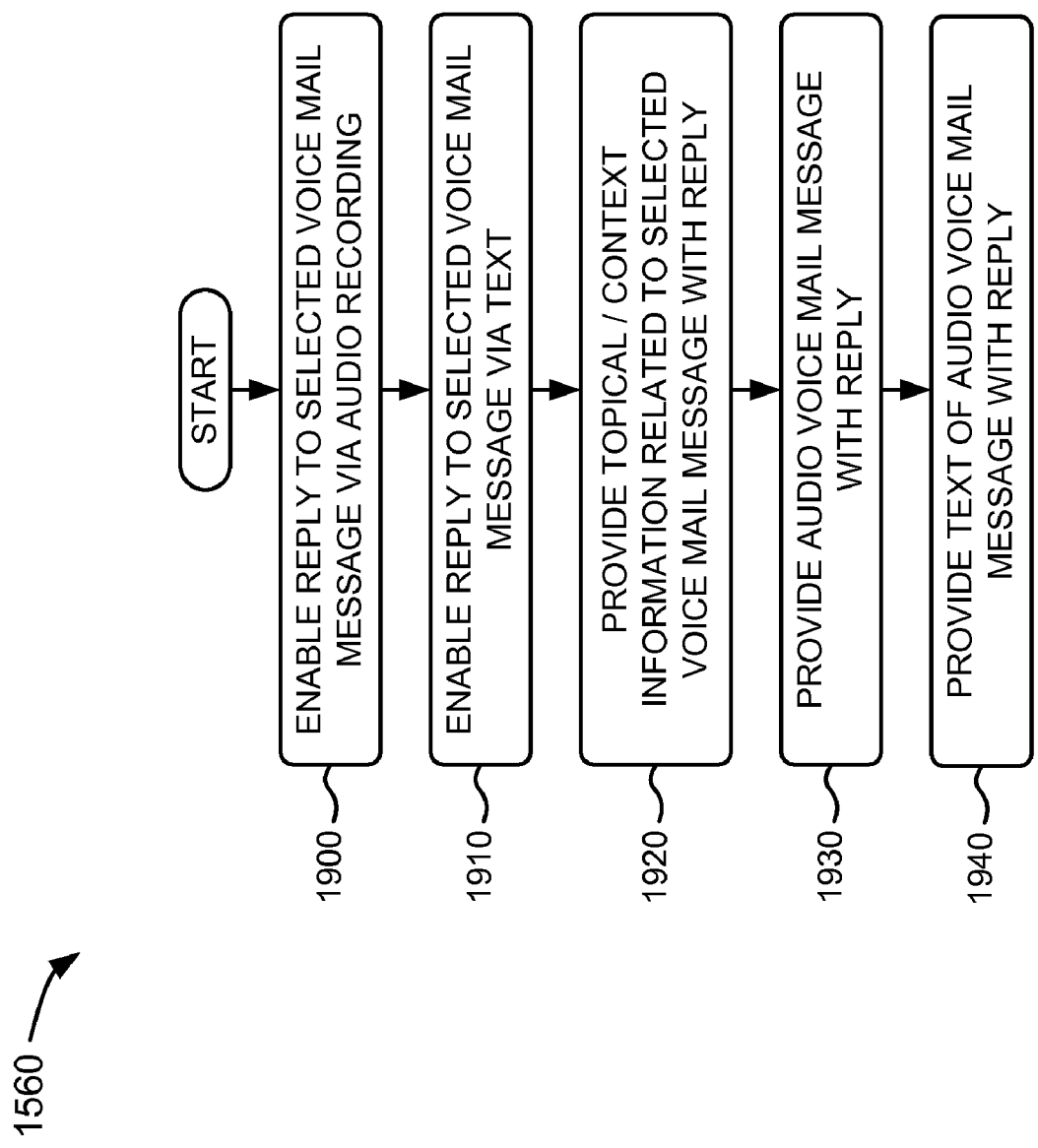

Alternatively and/or additionally, process block 1560 may include the process blocks illustrated in FIG. 19. As shown in FIG. 19, process block 1560 may include enabling a reply to the selected voice mail message via an audio recording (block 1900). For example, in one implementation described above in connection with FIG. 10, user interface 1000 (e.g., provided by VMA server 125) may include record reply button 1030. If record reply button 1030 is selected, the user may record an audio reply to the selected voice mail message (e.g., which may be provided via network 100 to the party who created the selected voice mail message).

Process block 1560 may also include enabling a reply to the selected voice mail message via text (block 1910). For example, in one implementation described above in connection with FIG. 10, user interface 1000 may include section 1010 for typing a reply to the selected voice mail message, and submit button 1020 for submitting the reply typed in section 1010. If the user selects submit button 1020, the typed reply of section 1010 may be sent (e.g., via network 100) to the party who created the selected voice mail message (e.g., via an e-mail, SMS, text, or instant message). Alternatively and/or additionally, the typed reply of section 1010 may be converted into an audio reply (e.g., via a text-to-speech converter provided in AAVM server 120), and the audio reply may be sent (e.g., via network 100) to the party who created the selected voice mail message (e.g., via a voice mail message).

As further shown in FIG. 19, process block 1560 may include providing topical and/or context information related to the selected voice mail message with a reply (block 1920). For example, in one implementation described above in connection with FIG. 10, user interface 1000 may provide include context information button 1040. If include context information button 1040 is selected, VMA server 125 may include context information with the reply to the selected voice mail message, as described above in connection with FIG. 11.

Process block 1560 may include providing the selected audio voice mail message with a reply (block 1930). For example, in one implementation described above in connection with FIG. 10, user interface 1000 may provide include audio file button 1050. If include audio file button 1050 is selected, VMA server 125 may attach the audio file, associated with the selected voice mail message, with the reply to the selected voice mail message.

As further shown in FIG. 19, process block 1560 may include providing the text of the selected audio voice mail message with a reply (block 1940). For example, in one implementation described above in connection with FIG. 10, user interface 1000 may provide include text file button 1060. If include text file button 1060 is selected, VMA server 125 may attach the converted text file (e.g., converted text 320), associated with the selected voice mail message, with the reply to the selected voice mail message.

Implementations described herein may include systems and methods that automatically analyze voice mail messages and provide information about voice mail messages that may be valuable to a user in prioritizing review of the voice mail messages. The systems and methods may filter the content of the voice mail messages and may perform actions on the voice mail messages based on user preferences. For example, in one implementation, the systems and methods may convert the audio voice mail messages to text voice mail messages, and may extract information from the text voice mail messages. The information, the text voice mail messages, and the voice mail messages may be provided to a user, and the user may access, review, prioritize, reply to, etc. this content as desired.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 13-19, the order of the acts may be modified in other implementations. Further, non-dependent acts may be performed in parallel.

Also, the term "user" has been used herein. The term "user" is intended to be broadly interpreted to include a user device or a user of a user device.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, an audio voice mail message;
   converting, by the device, the audio voice mail message to a text message;
   analyzing, by the device, the text message to identify:
      information identifying a topic of the audio voice mail message, and
      information identifying a context of the audio voice mail message;
   extracting, by the device and from the text message, the information identifying the topic of the audio voice mail message and the information identifying the context of the audio voice mail message;
   providing, by the device and to a user device, the audio voice mail message, the text message, the extracted information identifying the topic of the audio voice mail message, and the extracted information identifying the context of the audio voice mail message; and
   receiving, by the device, a reply to the audio voice mail message, the reply including the extracted information identifying the topic of the audio voice mail message and the extracted information identifying the context of the audio voice mail message.

2. The method of claim 1, where converting the audio voice mail message comprises:
   converting the audio voice mail message to the text message using a speech recognition application, and
   where the extracted information identifying the topic of the audio voice mail message is different from the extracted information identifying the context of the audio voice mail message.

3. The method of claim 1, where providing the audio voice mail message, the text message, the extracted information identifying the topic of the audio voice mail message, and the extracted information identifying the context of the audio voice mail message comprises:
    transmitting the audio voice mail message, the text message, the extracted information identifying the topic of the audio voice mail message, and the extracted information identifying the context of the audio voice mail message to a set top box associated with the user via a network.

4. The method of claim 1, further comprising:
    identifying another message that is the audio voice mail message based on at least one of the information identifying the topic of the audio voice mail message or the information identifying the context of the audio voice mail message, and
    where providing the audio voice mail message, the text message, the extracted information identifying the topic of the audio voice mail message, and the extracted information identifying the context of the voice mail message includes:
        providing information identifying the other message to the device associated with the user.

5. A method, comprising:
    receiving, by a first device, voice mail information extracted from an audio voice mail message from a second device, the voice mail information including topical information and contextual information associated with a content of the audio voice mail message;
    determining, by the first device, a delivery technique for the voice mail information based on one or more user preferences of a user;
    providing, by the first device, the voice mail information to a third device, of a plurality of third devices associated with the user, based on the determined delivery technique;
    receiving, by the first device and from the third device, a selection of the audio voice mail message based on the voice mail information;
    receiving, by the first device and from the third device, a reply to the selected audio voice mail message, the reply including the topical information and the contextual information included in the voice mail information; and
    transmitting, by the first device, the reply, including the topical information and the contextual information to the second device.

6. The method of claim 5, further comprising:
    sending notification information about the audio voice mail message based on the determined delivery technique.

7. The method of claim 5, further comprising:
    identifying content, related to the selected audio voice mail message, based on the topical information and the contextual information; and
    providing the content to the third device, for display on the third device in conjunction with the selected audio voice mail message based on receiving the selection.

8. The method of claim of claim 5, where receiving the reply to the selected audio voice mail message comprises at least one of:
    providing the selected audio voice mail message with the reply; or
    providing text of the selected audio voice mail message with the reply.

9. The method of claim 7, where identifying the content comprises:
    associating the content with the selected audio voice mail message based on the one or more user preferences.

10. The method of claim 5, further comprising:
    determining that the voice mail information does not include information identifying a party associated with providing the audio voice mail message;
    comparing a phone number associated with the audio voice mail message to one or more entries included in an address book that is associated with the user; and
    determining the information identifying the party based on comparing the phone number to the one or more entries;
    where providing the voice mail information comprises:
        providing the information identifying the party and at least one of:
            information identifying a date and a time associated with the audio voice mail message;
            information identifying a duration of the audio voice mail message;
            information identifying an urgency of the audio voice mail message; or
            information identifying whether the audio voice mail message has been reviewed.

11. The method of claim 5, further comprising:
    selecting a user interface, of a plurality of user interfaces, based on the determined delivery technique,
    where providing the voice mail information includes:
        providing the selected user interface to the third device, the voice mail information being displayed to the user via the selected user interface, and
    the selection of the audio voice mail message and the reply being received, from the third device, via the selected user interface.

12. The method of claim 10, where the address book is stored in a memory of the first device.

13. A system, comprising:
    one or more devices to:
        receive an audio voice mail message,
        convert the audio voice mail message to a text message,
        extract voice mail information from the text message,
        provide the voice mail information, associated with the audio voice mail message, to enable review of the voice mail information by a user,
        receive, from the user, a selection of the audio voice mail message based on the voice mail information, and
        receive, from the user, a reply to the selected audio voice mail message, the reply including the voice mail information.

14. The system of claim 13, where the one or more devices are further to:
    examine the text message for topical information;
    examine the text message for context information; and
    extract the topical and context information from the text message, where the voice mail information includes the extracted topical and context information.

15. The system of claim 13, where the one or more devices are further to:
    determine, based on voice mail information, to provide the voice mail information to a device associated with the user, the device comprising at least one of:
        a computer;
        a cellular phone;
        a telephone; or
        a set top box,
    provide a user interface, of a plurality of user interfaces, based on the device, and
    receive, via the user interface:
        the selection of the audio voice mail message, and
        the reply.

16. The system of claim 13, where the one or more devices are further to at least one of:
provide the voice mail information via an e-mail message;
provide the voice mail information via a Short Message Service (SMS) message; or
provide the voice mail information via an instant message.

17. The system of claim 13, where the one or more devices are further to:
determine a delivery technique for the voice mail information based on user preferences; and
provide the voice mail information for display to the user based on the determined delivery technique.

18. The system of claim 17, where the one or more devices are further to:
send notification information to notify the user that the audio voice mail message has been received based on the determined delivery technique.

19. The system of claim 18, where the one or more devices are further to at least one of:
send the notification information via an e-mail message;
send the notification information via a Short Message Service (SMS) message;
send the notification information via an instant message; or
send the notification information via a pop-up message.

20. The system of claim 13, where the one or more devices are further to:
associate one or more other messages with the selected audio voice mail message based on the voice mail information; and
provide the associated one or more other messages and the selected audio voice mail message based on receiving the selection.

21. The system of claim 20, where the one or more devices are further to:
receive information identifying related content from the user, and
associate the related content with the selected audio voice mail message based on receiving the information identifying the related content.

22. The system of claim 21, where the one or more devices are further to at least one of:
provide the selected audio voice mail message with the reply; or
provide text of the selected audio voice mail message with the reply.

23. The system of claim 21, where the one or more devices are further to:
provide the related content for display to the user.

24. The system of claim 21, where the related content comprises at least one of:
a message;
a document; or
an image.

25. A system, comprising:
one or more processors; and
a memory to store one or more instructions which, when executed by the one or more processors, cause the one or more processors to:
receive an audio voice mail message;
convert the audio voice mail message to a text message;
analyze the text message to identify:
information identifying a topic of the audio voice mail message, and
information identifying a context of the audio voice mail message;
extract, from the text message, the information a identifying the topic of the audio voice mail message and the information a identifying the context of the audio voice mail message;
provide, to a device associated with a user, the audio voice mail message, the text message, the extracted information identifying the topic of the audio voice mail message, and the extracted information identifying the context of the audio voice mail message;
receive, from the device associated with the user, a response to the audio voice mail message, the response including the audio voice mail message, the text message, the extracted information identifying the topic of the audio voice mail message, and the extracted information identifying the context of the audio voice mail message.

* * * * *